US009335526B2

(12) United States Patent  
Matsumura et al.

(10) Patent No.: US 9,335,526 B2  
(45) Date of Patent: May 10, 2016

(54) ZOOM LENS SYSTEM, INTERCHANGEABLE LENS APPARATUS AND CAMERA SYSTEM

(71) Applicant: Panasonic Corporation, Kadoma-shi, Osaka (JP)

(72) Inventors: Yoshio Matsumura, Osaka (JP); Masafumi Sueyoshi, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/484,282

(22) Filed: Sep. 12, 2014

(65) Prior Publication Data

US 2014/0375844 A1  Dec. 25, 2014

Related U.S. Application Data

(63) Continuation of application No. PCT/JP2013/001134, filed on Feb. 26, 2013.

(30) Foreign Application Priority Data

Mar. 14, 2012  (JP) ................. 2012-057032

(51) Int. Cl.
  *G02B 15/14*  (2006.01)
  *G02B 15/15*  (2006.01)
  *G02B 15/173*  (2006.01)
  *G02B 27/64*  (2006.01)

(52) U.S. Cl.
  CPC .............. *G02B 15/15* (2013.01); *G02B 15/14* (2013.01); *G02B 15/173* (2013.01); *G02B 27/646* (2013.01)

(58) Field of Classification Search
  CPC ......... G02B 15/14; G02B 15/16; G02B 15/20
  USPC .................................. 359/676, 683
  See application file for complete search history.

(56) References Cited

U.S. PATENT DOCUMENTS 5,623,364 A * 4/1997 Morooka ............. G02B 27/646  
 359/554  
7,187,504 B2  3/2007 Horiuchi  
8,339,714 B2 * 12/2012 Tochigi ................ G02B 15/173  
 359/683

FOREIGN PATENT DOCUMENTS

| JP | H06-148523 A | 5/1994 |
| JP | H07-151972 A | 6/1995 |
| JP | H08-327905 A | 12/1996 |
| JP | H10-039211 A | 2/1998 |
| JP | 2002-228931 A | 8/2002 |
| JP | 2008-261996 A | 10/2008 |
| JP | 2009-069671 A | 4/2009 |

(Continued)

*Primary Examiner* — William Choi  
(74) *Attorney, Agent, or Firm* — James W. Judge

(57) ABSTRACT

A zoom lens system having at least five lens units, each lens unit being composed of at least one lens element, the zoom lens system, in order from an object side to an image side, comprising: a positive first lens unit; and a negative second lens unit, and in order from the image side to the object side, comprising: a positive lens unit γ; a negative lens unit β; and a positive lens unit α, wherein the first lens unit is composed of only optical elements having optical power, and in zooming from a wide-angle limit to a telephoto limit, at least the positive first lens unit is fixed with respect to an image surface, the positive lens unit α moves with respect to the image surface separately from an aperture diaphragm, and the negative lens unit β moves to the object side.

19 Claims, 16 Drawing Sheets

(56) References Cited

FOREIGN PATENT DOCUMENTS

| | | |
|---|---|---|
| JP | 2009-109630 A | 5/2009 |
| JP | 2009-128620 A | 6/2009 |
| JP | 2010-170084 A | 8/2010 |
| JP | 2011-039101 A | 2/2011 |
| JP | 2011-197472 A | 10/2011 |
| JP | 2012-047814 A | 3/2012 |
| JP | 2012-083601 A | 4/2012 |
| JP | 2012-083602 A | 4/2012 |
| JP | 2012-113182 A | 6/2012 |

* cited by examiner

ZOOM LENS SYSTEM, INTERCHANGEABLE LENS APPARATUS AND CAMERA SYSTEM

RELATED APPLICATIONS

This application is a Continuation of International Application No. PCT/JP2013/001134, filed on Feb. 26, 2013, which in turn claims the benefit of Japanese Application No. 2012-057032, filed on Mar. 14, 2012, the disclosures of which Applications are incorporated by reference herein.

BACKGROUND

1. Field

The present disclosure relates to zoom lens systems, interchangeable lens apparatuses, and camera systems.

2. Description of the Related Art

In recent years, interchangeable-lens type digital camera systems (also referred to simply as "camera systems", hereinafter) have been spreading rapidly. Such interchangeable-lens type digital camera systems realize: taking of high-sensitive and high-quality images; high-speed focusing and high-speed image processing after image taking; and easy replacement of an interchangeable lens apparatus in accordance with a desired scene. Meanwhile, an interchangeable lens apparatus having a zoom lens system that forms an optical image with variable magnification is popular because it allows free change of focal length without the necessity of lens replacement.

Zoom lens systems having excellent optical performance from a wide-angle limit to a telephoto limit have been desired as zoom lens systems to be used in interchangeable lens apparatuses. For example, various kinds of zoom lens systems each having a multiple-unit construction in which a positive lens unit is located closest to an object side have been proposed.

Japanese Laid-Open Patent Publication No. 08-327905 discloses a zoom lens having a five-unit construction of positive, negative, positive, negative, and positive, in which the relationship between the focal length of the first lens unit and the focal length of the second lens unit, and the relationship between the focal length of the fourth lens unit and the focal length of the fifth lens unit are set forth.

Japanese Laid-Open Patent Publication No. 10-039211 discloses a zoom lens having a five-unit construction of positive, negative, positive, negative, and positive, in which the second lens unit and the fourth lens unit move at the time of magnification change, and the magnification of the second lens unit and the magnification of the fourth lens unit individually become 1.0× at almost the same time.

Japanese Laid-Open Patent Publication No. 2002-228931 discloses a zoom lens having a five-unit construction of positive, negative, positive, negative, and positive, in which the constructions of the first lens unit, the second lens unit, the third lens unit, and the fourth lens unit, and the relationship between the magnification of the second lens unit and the magnification of the third lens unit are set forth.

Japanese Laid-Open Patent Publication No. 2009-109630 discloses a zoom lens having a two-unit construction of positive and negative, in which the second lens unit moves at the time of magnification change, and the refractive index and the Abbe number of a material constituting the first lens unit are set forth.

Japanese Laid-Open Patent Publication No. 2011-197472 discloses a zoom lens including a plurality of lens units that move at the time of magnification change, in which at least two of the lens units are focusing lens units, and an exit pupil position at a wide-angle limit, a focal length of a wobbling lens unit, and the like are set forth.

SUMMARY

The present disclosure provides a compact and lightweight zoom lens system having a short overall length of lens system as well as excellent optical performance. Further, the present disclosure provides an interchangeable lens apparatus and a camera system each employing the zoom lens system.

The novel concepts disclosed herein were achieved in order to solve the foregoing problems in the related art, and herein is disclosed:

a zoom lens system having at least five lens units, each lens unit being composed of at least one lens element, the zoom lens system, in order from an object side to an image side, comprising:

a first lens unit having positive optical power; and a second lens unit having negative optical power, and the zoom lens system, in order from the image side to the object side, comprising:

a lens unit γ having positive optical power;

a lens unit β having negative optical power; and a lens unit α having positive optical power, wherein the first lens unit is composed of only optical elements having optical power, and in zooming from a wide-angle limit to a telephoto limit at a time of image taking, at least the first lens unit is fixed with respect to an image surface, the lens unit α moves with respect to the image surface separately from an aperture diaphragm, and the lens unit β moves to the object side.

The novel concepts disclosed herein were achieved in order to solve the foregoing problems in the related art, and herein is disclosed:

an interchangeable lens apparatus comprising:

a zoom lens system; and a lens mount section which is connectable to a camera body including an image sensor for receiving an optical image formed by the zoom lens system and converting the optical image into an electric image signal, wherein the zoom lens system is a zoom lens system having at least five lens units, each lens unit being composed of at least one lens element, the zoom lens system, in order from an object side to an image side, comprising:

a first lens unit having positive optical power; and a second lens unit having negative optical power, and the zoom lens system, in order from the image side to the object side, comprising:

a lens unit γ having positive optical power;

a lens unit β having negative optical power; and a lens unit α having positive optical power, wherein the first lens unit is composed of only optical elements having optical power, and in zooming from a wide-angle limit to a telephoto limit at a time of image taking, at least the first lens unit is fixed with respect to an image surface, the lens unit α moves with respect to the image surface separately from an aperture diaphragm, and the lens unit β moves to the object side.

The novel concepts disclosed herein were achieved in order to solve the foregoing problems in the related art, and herein is disclosed:

a camera system comprising:

an interchangeable lens apparatus including a zoom lens system; and a camera body which is detachably connected to the interchangeable lens apparatus via a camera mount section, and includes an image sensor for receiving an optical image formed by the zoom lens system and converting the optical image into an electric image signal, wherein the zoom lens system is a zoom lens system having at least five lens units, each lens unit being composed of at least one lens element, the zoom lens system, in order from an object side to an image side, comprising:

a first lens unit having positive optical power; and a second lens unit having negative optical power, and the zoom lens system, in order from the image side to the object side, comprising:

a lens unit γ having positive optical power;

a lens unit β having negative optical power; and a lens unit α having positive optical power, wherein the first lens unit is composed of only optical elements having optical power, and in zooming from a wide-angle limit to a telephoto limit at a time of image taking, at least the first lens unit is fixed with respect to an image surface, the lens unit α moves with respect to the image surface separately from an aperture diaphragm, and the lens unit β moves to the object side.

The zoom lens system according to the present disclosure is compact and lightweight, and has a short overall length of lens system as well as excellent optical performance.

BRIEF DESCRIPTION OF THE DRAWINGS

This and other objects and features of the present disclosure will become clear from the following description, taken in conjunction with the exemplary embodiments with reference to the accompanied drawings in which.

DETAILED DESCRIPTION

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicants provide the attached drawings and the following description so that those skilled in the art can fully understand this disclosure. Therefore, the drawings and description are not intended to limit the subject defined by the claims.

(Embodiments 1 to 5)

FIGS. 1, 4, 7, 10, and 13 are lens arrangement diagrams of zoom lens systems according to Embodiments 1 to 5, respectively.

Figure 7:
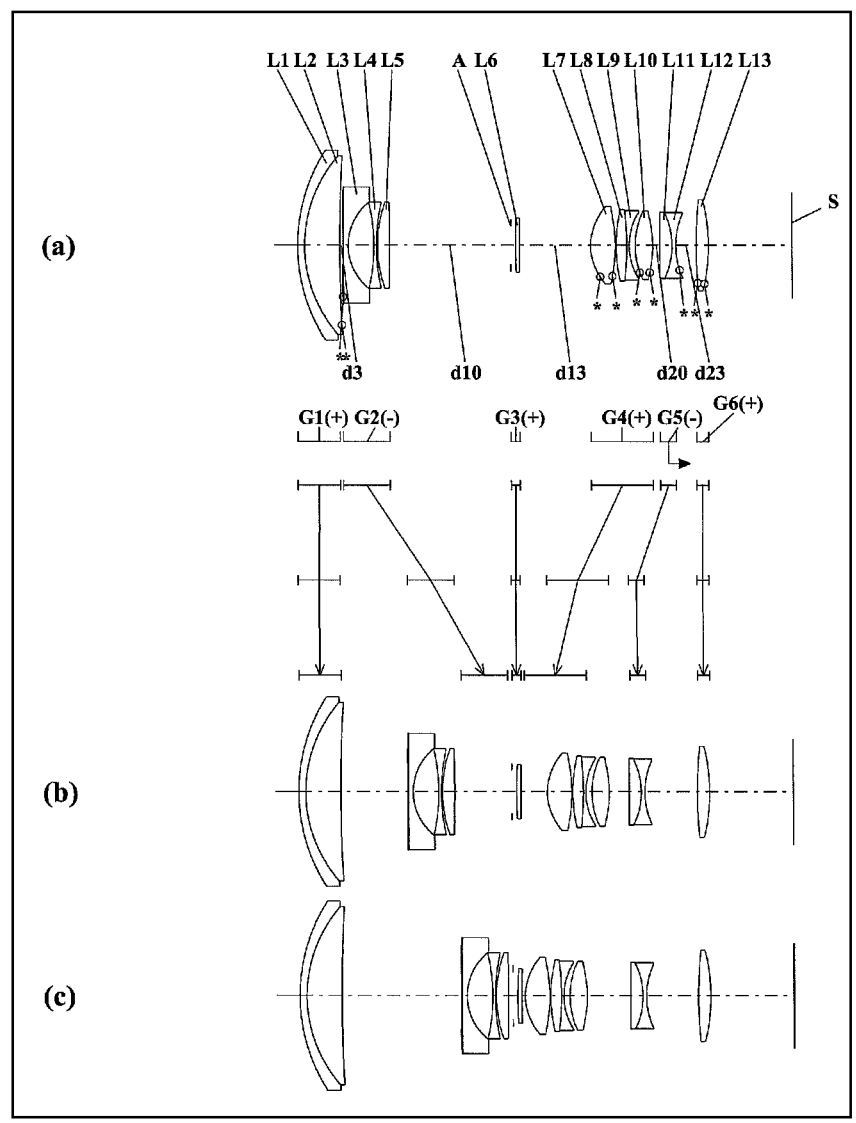
FIG. 7 is a lens arrangement diagram showing an infinity in-focus condition of a zoom lens system according to Embodiment 3 (Numerical Example 3)
Figure 8:
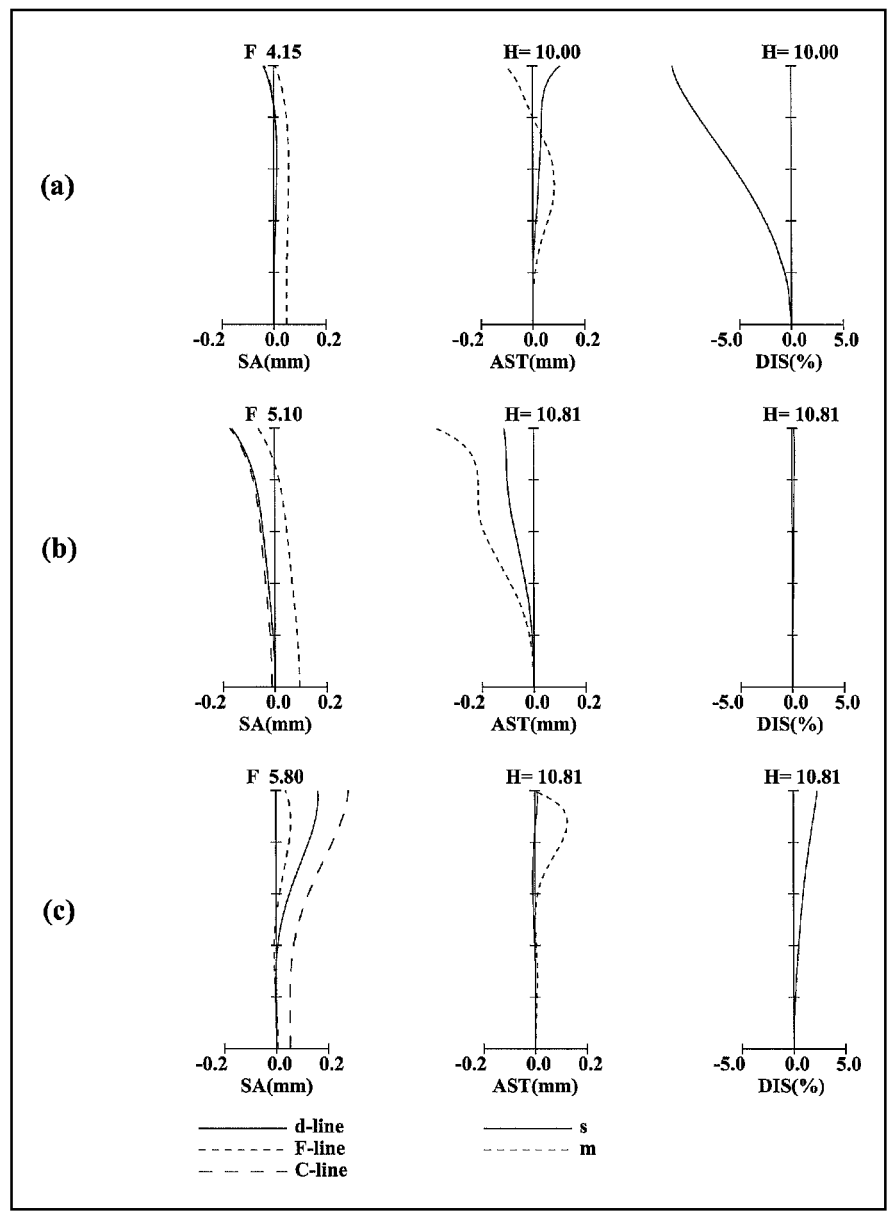
FIG. 8 is a longitudinal aberration diagram of an infinity in-focus condition of a zoom lens system according to Numerical Example 3.
Figure 9:
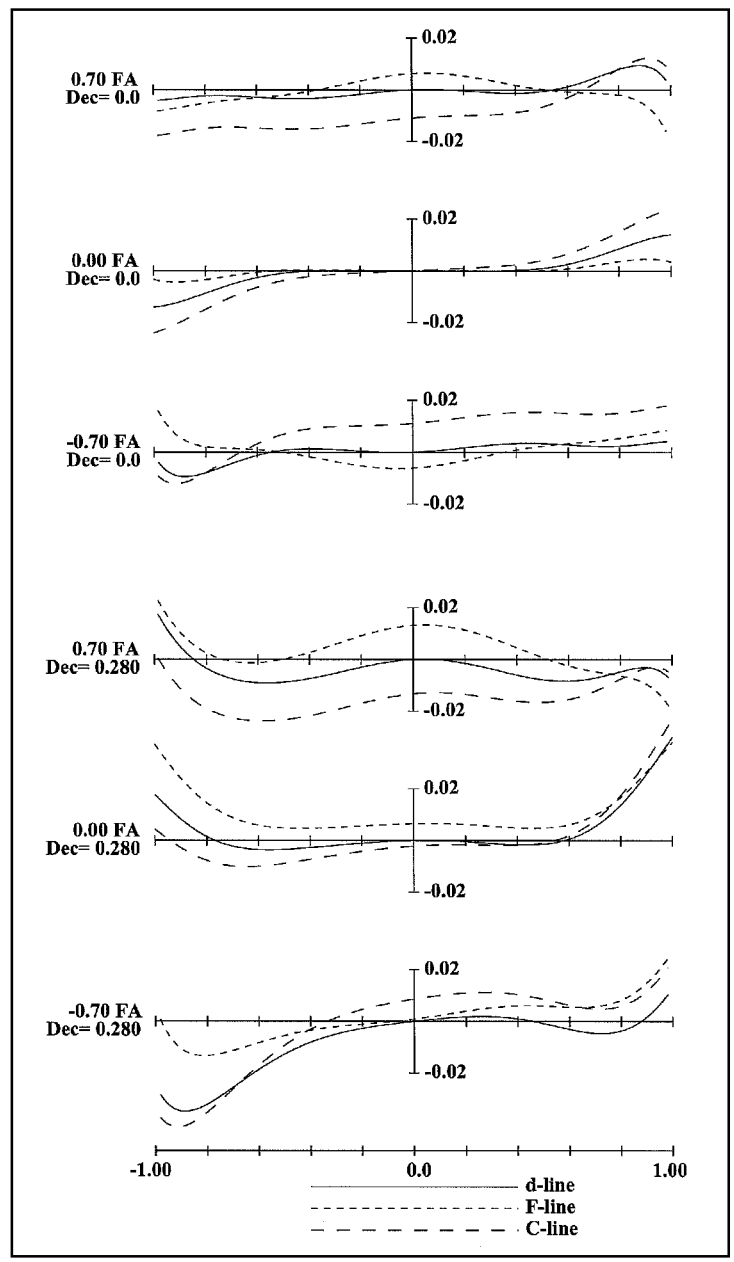
FIG. 9 is a lateral aberration diagram of a zoom lens system according to Numerical Example 3 at a telephoto limit in a basic state where image blur compensation is not performed and in an image blur compensation state.
Figure 10:
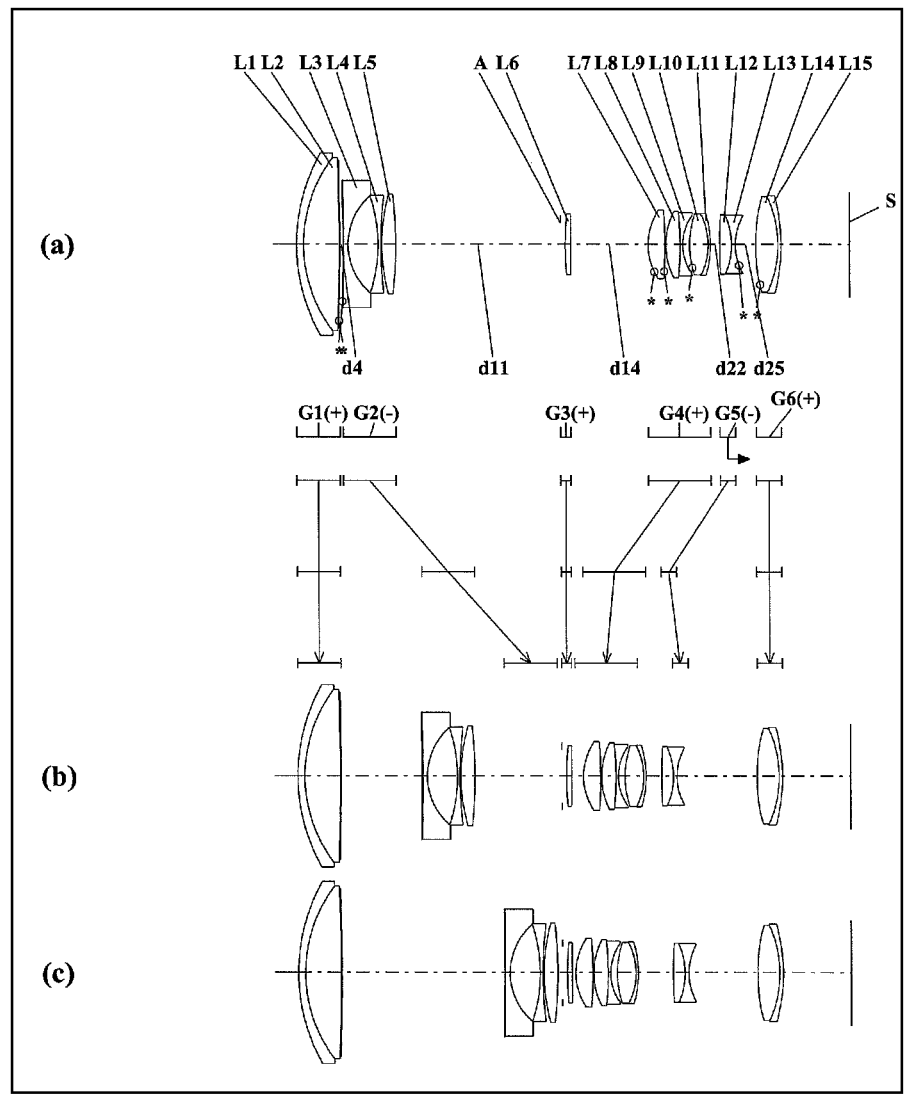
FIG. 10 is a lens arrangement diagram showing an infinity in-focus condition of a zoom lens system according to Embodiment 4 (Numerical Example 4)
Figure 11:
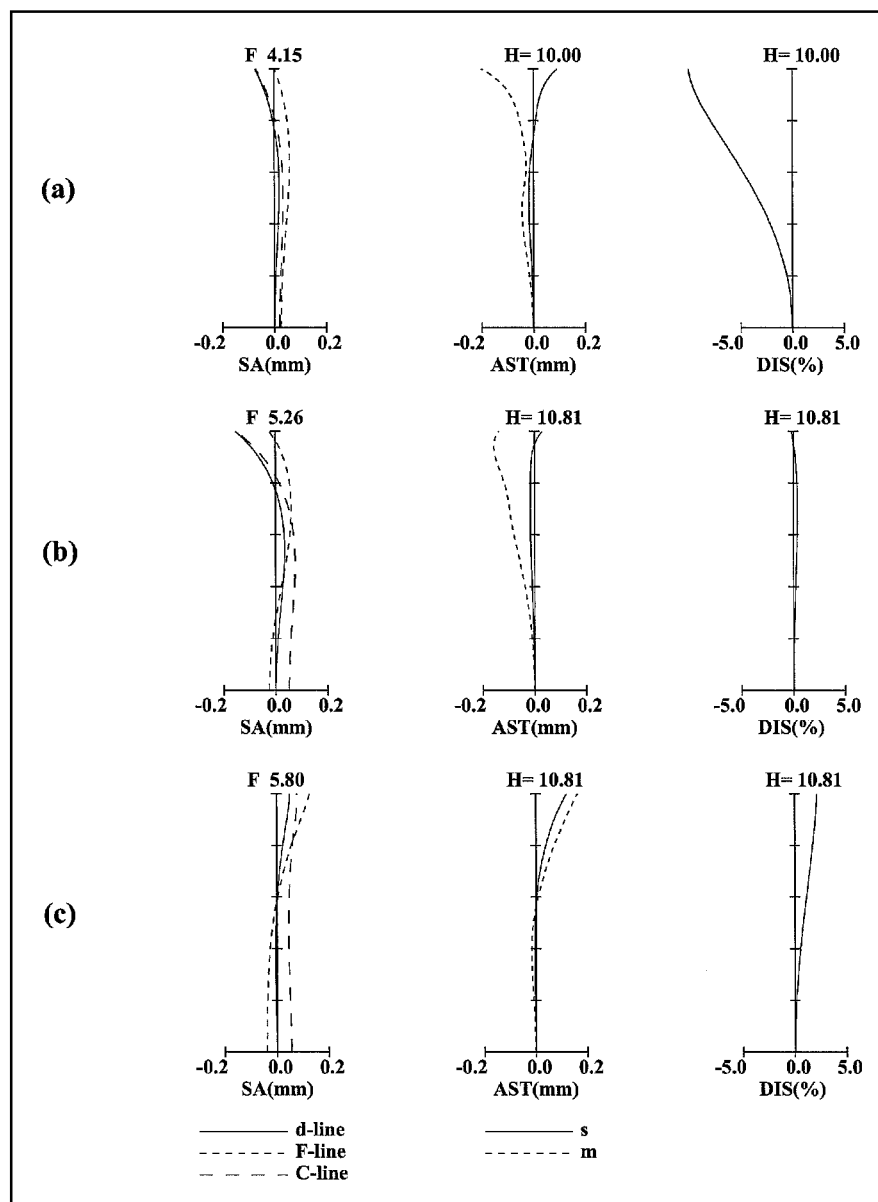
FIG. 11 is a longitudinal aberration diagram of an infinity in-focus condition of a zoom lens system according to Numerical Example 4.
Figure 12:
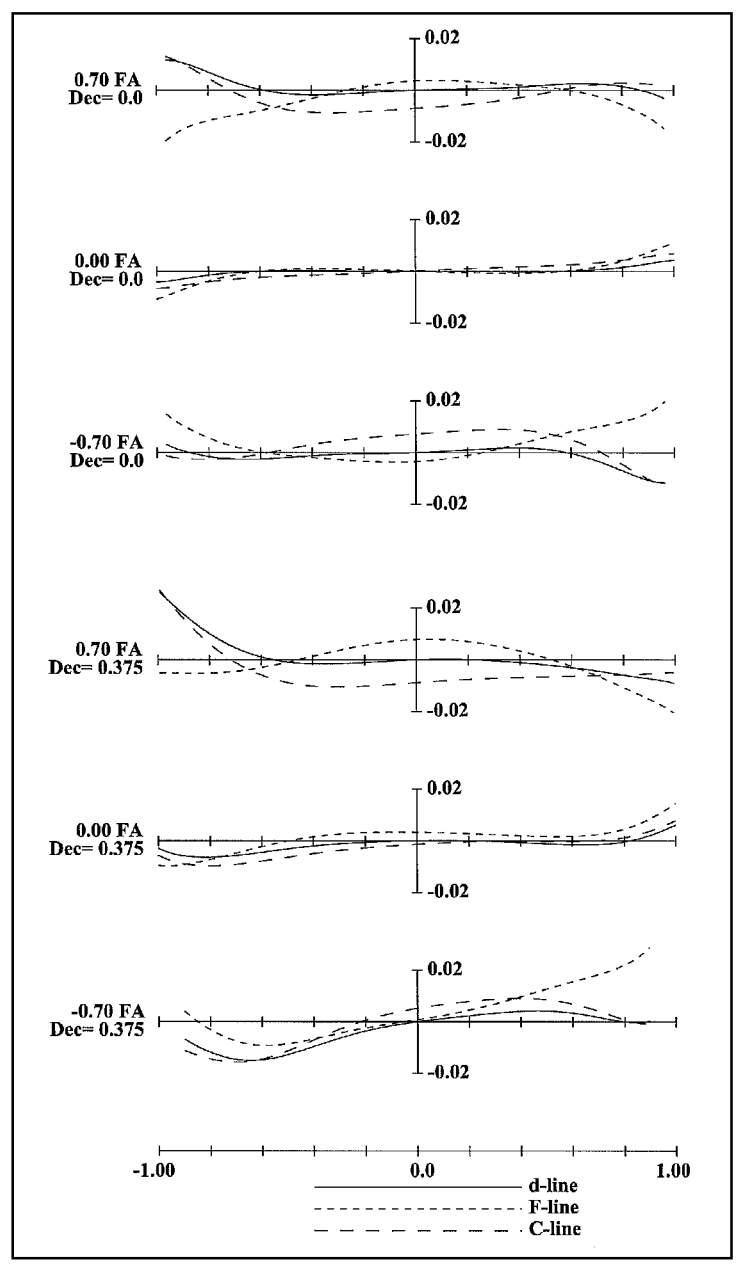
FIG. 12 is a lateral aberration diagram of a zoom lens system according to Numerical Example 4 at a telephoto limit in a basic state where image blur compensation is not performed and in an image blur compensation state.
Figure 13:
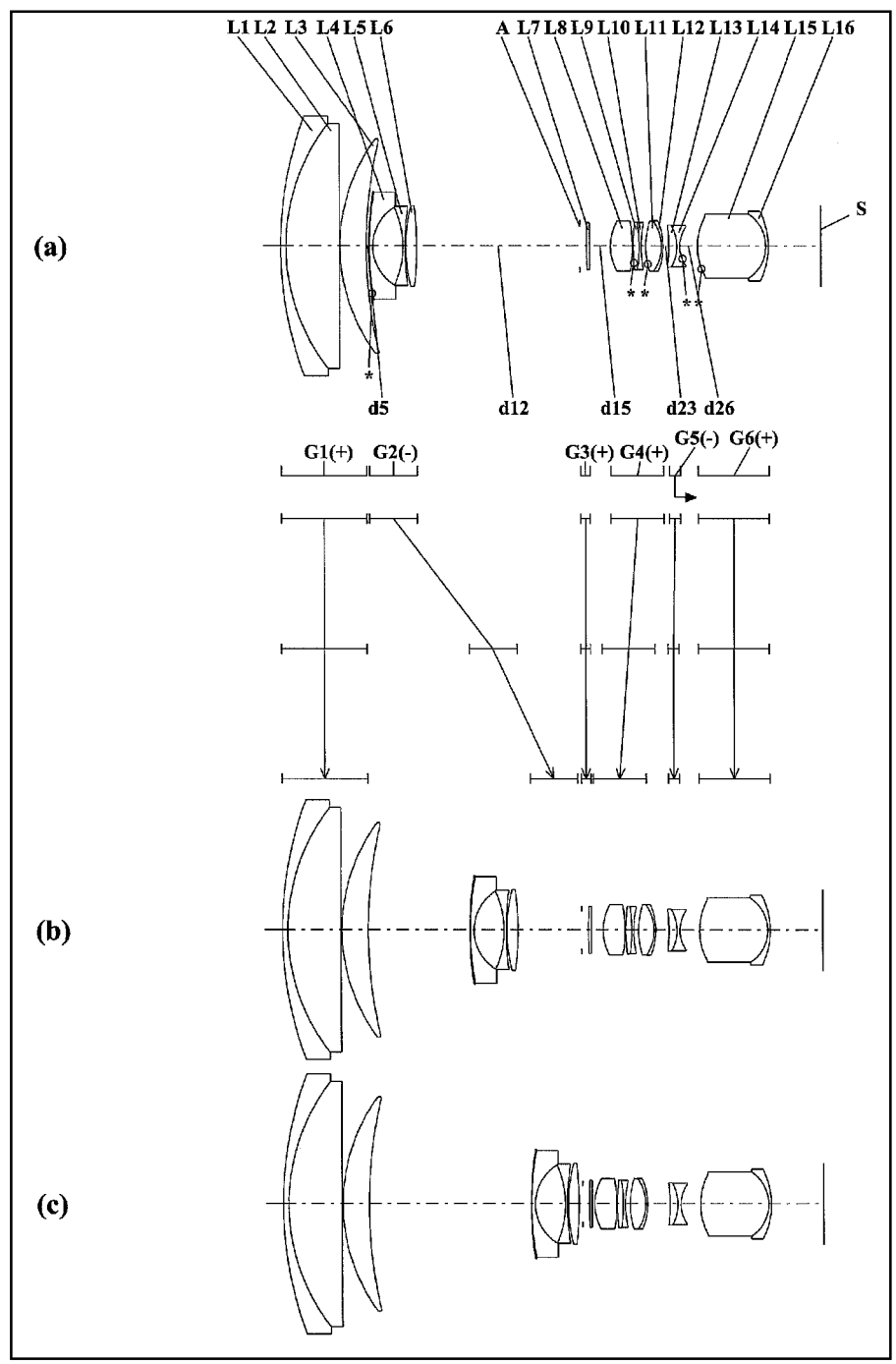
FIG. 13 is a lens arrangement diagram showing an infinity in-focus condition of a zoom lens system according to Embodiment 5 (Numerical Example 5)
Figure 14:
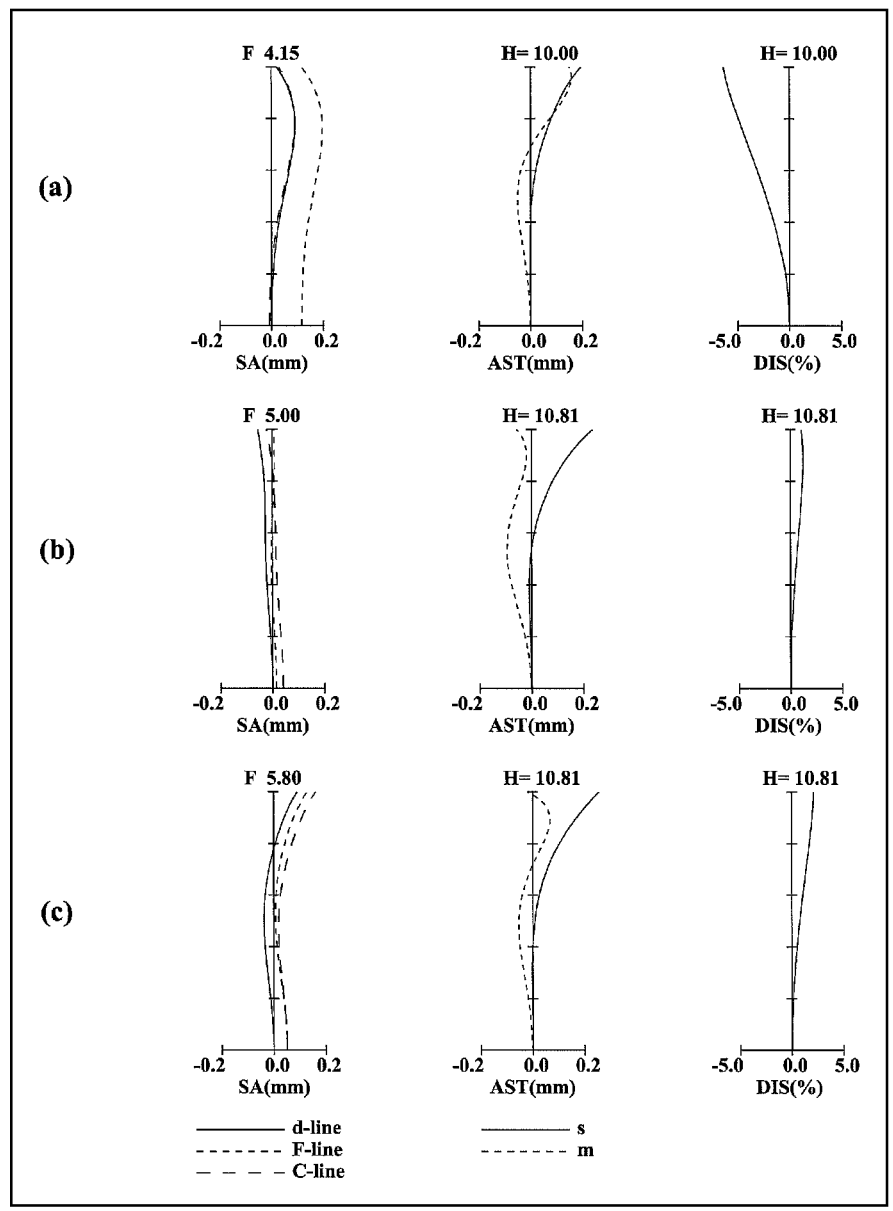
FIG. 14 is a longitudinal aberration diagram of an infinity in-focus condition of a zoom lens system according to Numerical Example 5.
Figure 15:
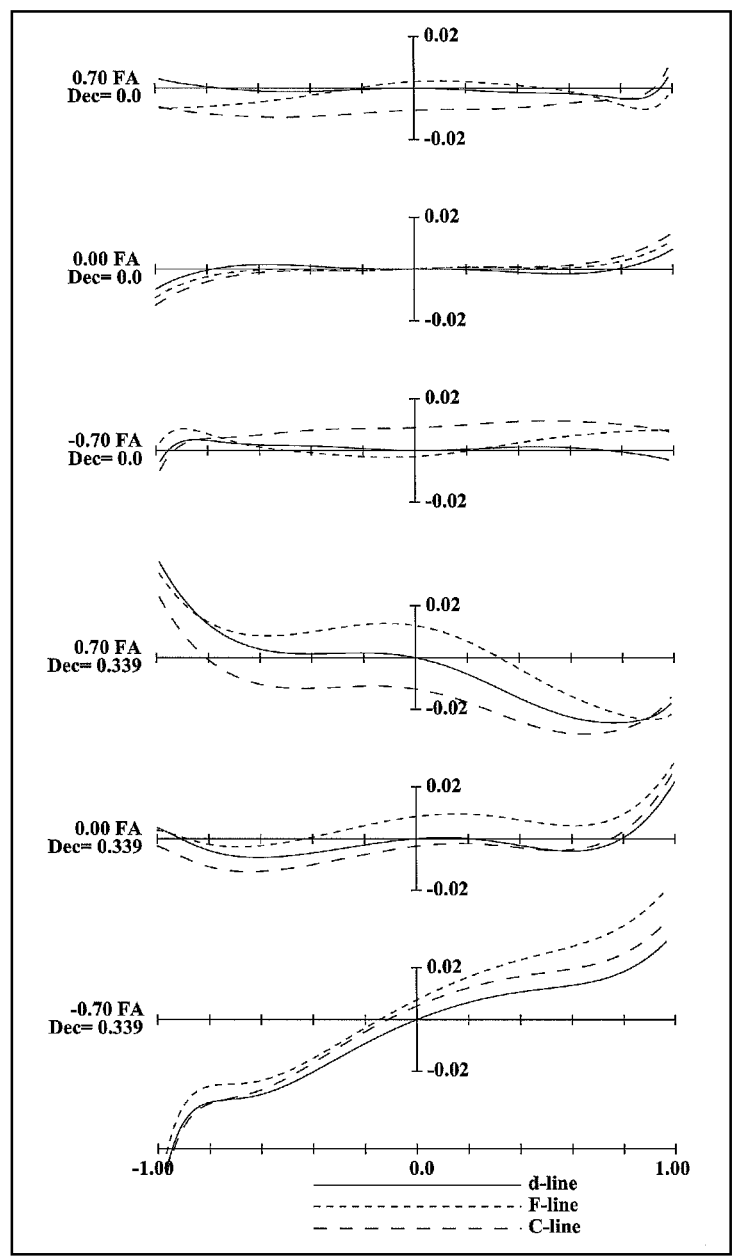
FIG. 15 is a lateral aberration diagram of a zoom lens system according to Numerical Example 5 at a telephoto limit in a basic state where image blur compensation is not performed and in an image blur compensation state.

Each of FIGS. 1, 4, 7, 10, and 13 shows a zoom lens system in an infinity in-focus condition. In each Fig., part (a) shows a lens configuration at a wide-angle limit (in the minimum focal length condition: focal length $f_W$), part (b) shows a lens configuration at a middle position (in an intermediate focal length condition: focal length $f_M=\sqrt{(f_W*f_T)}$), and part (c) shows a lens configuration at a telephoto limit (in the maximum focal length condition: focal length $f_T$). Further, in each Fig., each bent arrow located between part (a) and part (b) indicates a line obtained by connecting the positions of each lens unit respectively at a wide-angle limit, a middle position and a telephoto limit, in order from the top. In the part between the wide-angle limit and the middle position and the part between the middle position and the telephoto limit, the positions are connected simply with a straight line, and hence this line does not indicate actual motion of each lens unit. Further, in each Fig., an arrow imparted to a lens unit indicates focusing from an infinity in-focus condition to a close-object in-focus condition. That is, in FIGS. 1 and 4, the arrow indicates a moving direction of a fourth lens unit G4 described later, in focusing from an infinity in-focus condition to a close-object in-focus condition. In FIGS. 7, 10, and 13, the arrow indicates a moving direction of a fifth lens unit G5 described later, in focusing from an infinity in-focus condition to a close-object in-focus condition.

Each of the zoom lens systems according to Embodiments 1 and 2, in order from the object side to the image side, comprises a first lens unit G1 having positive optical power, a second lens unit G2 having negative optical power, a third lens unit G3 having positive optical power, a fourth lens unit G4 having negative optical power, and a fifth lens unit G5 having positive optical power. The zoom lens systems according to Embodiments 3 to 5, in order from the object side to the image side, comprises a first lens unit G1 having positive optical power, a second lens unit G2 having negative optical power, a third lens unit G3 having positive optical power, a fourth lens unit G4 having positive optical power, a fifth lens unit G5 having negative optical power, and a sixth lens unit G6 having positive optical power.

In FIGS. 1, 4, 7, 10, and 13, an asterisk "*" imparted to a particular surface indicates that the surface is aspheric. In each Fig., symbol (+) or (−) imparted to the symbol of each lens unit corresponds to the sign of the optical power of the lens unit. In each Fig., a straight line located on the most right-hand side indicates the position of an image surface S. Further, as shown in each Fig., an aperture diaphragm A is provided between the second lens unit G2 and the third lens unit G3.

(Embodiment 1)

Figure 1:
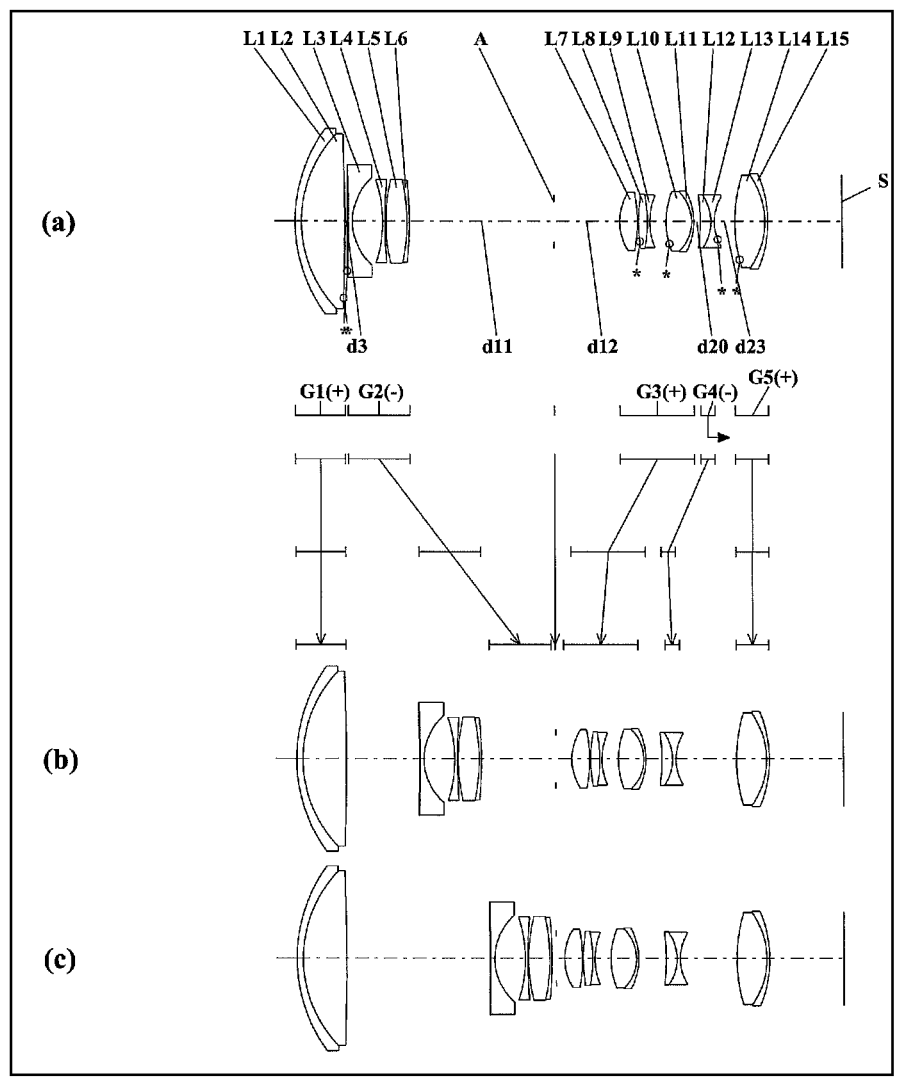
FIG. 1 is a lens arrangement diagram showing an infinity in-focus condition of a zoom lens system according to Embodiment 1 (Numerical Example 1)
Figure 2:
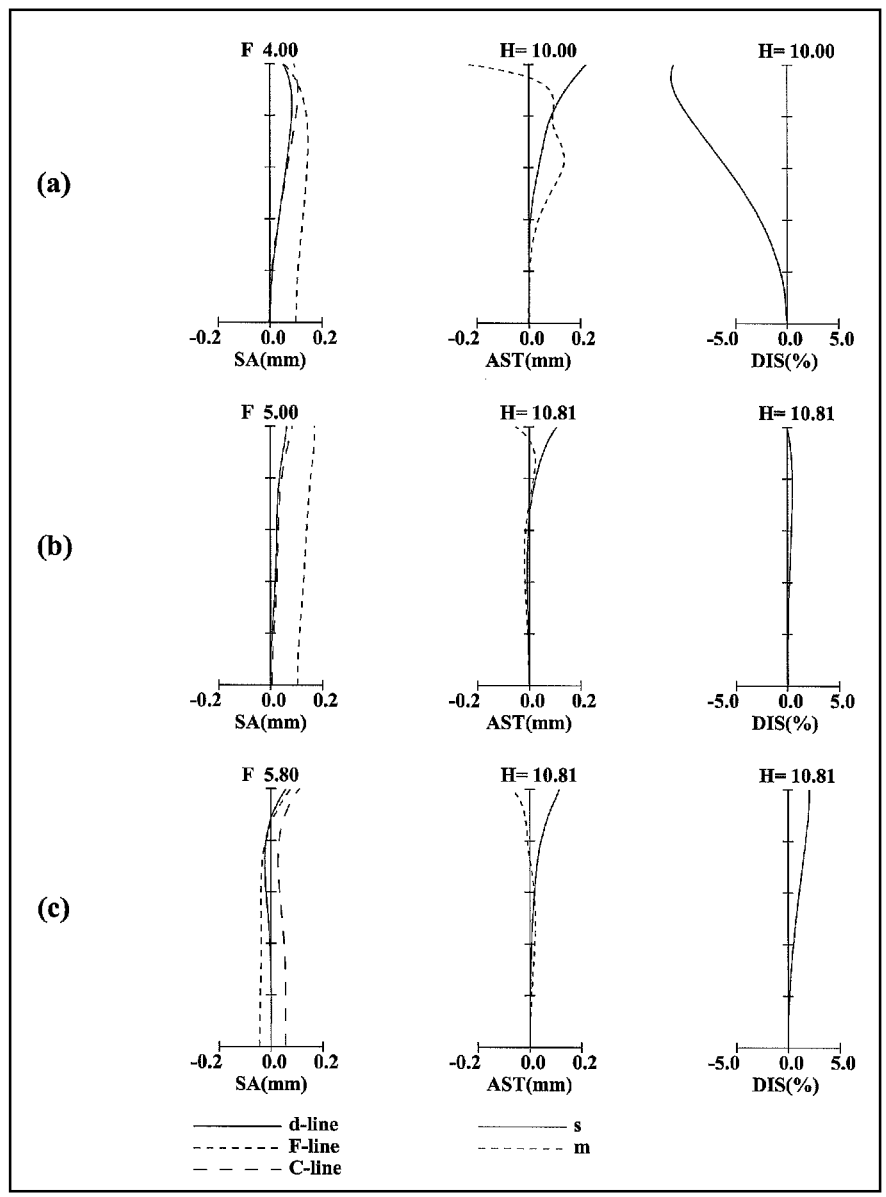
FIG. 2 is a longitudinal aberration diagram of an infinity in-focus condition of a zoom lens system according to Numerical Example 1.
Figure 3:
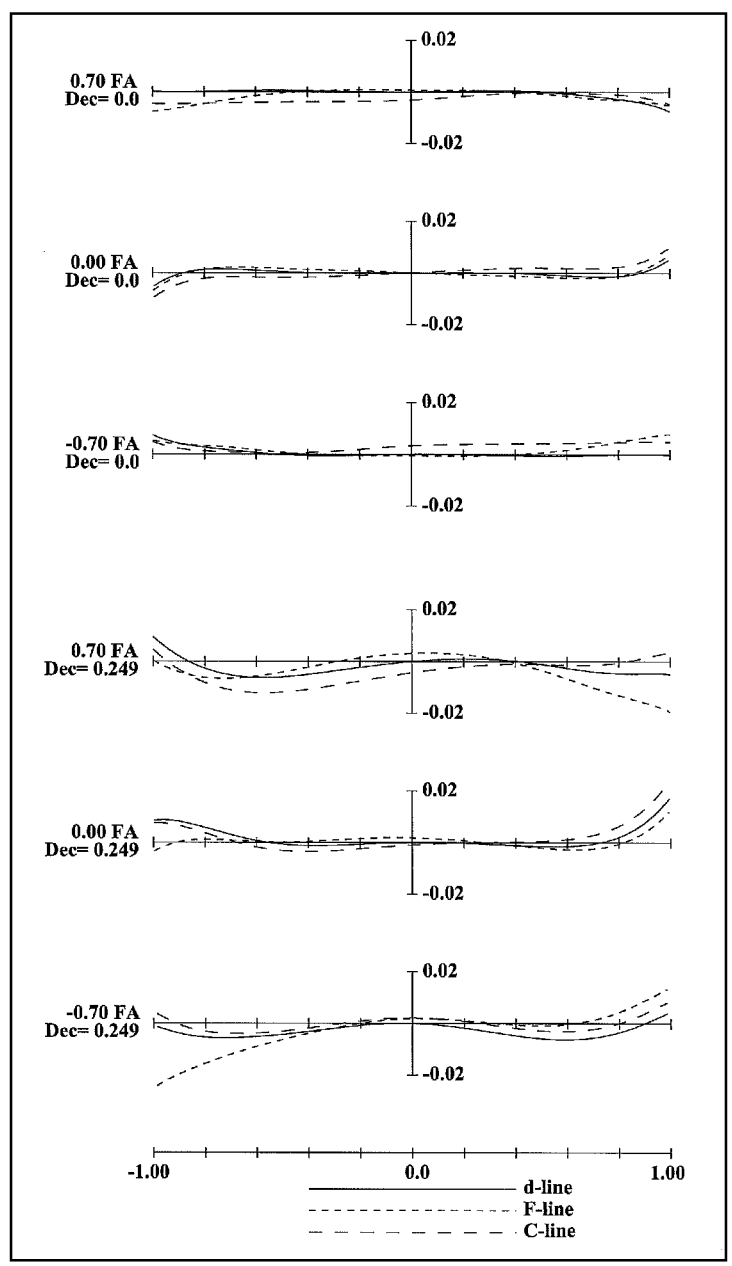
FIG. 3 is a lateral aberration diagram of a zoom lens system according to Numerical Example 1 at a telephoto limit in a basic state where image blur compensation is not performed and in an image blur compensation state.

As shown in FIG. 1, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. The second lens element L2 has an aspheric image side surface.

The second lens unit G2, in order from the object side to the image side, comprises: a bi-concave third lens element L3; a bi-concave fourth lens element L4; a bi-convex fifth lens element L5; and a negative meniscus sixth lens element L6 with the convex surface facing the image side. Among these, the fifth lens element L5 and the sixth lens element L6 are cemented with each other. The third lens element L3 is a hybrid lens element comprising: a lens element formed of a glass material; and a negative meniscus transparent resin layer with the convex surface facing the image side, which is formed of an ultraviolet curable resin and is cemented to an object side surface of the lens element. The third lens element L3 has an aspheric object side surface.

The hybrid lens element of the present disclosure has an aspheric surface facing the transparent resin layer side. Thereby, it is possible to form a large-diameter aspheric surface that is difficult to form by press molding when only a glass material is used. Further, as compared to the case where a lens element is formed of a resin only, the hybrid lens element is stable in terms of both refractive index change and shape change against temperature change. Therefore, it is possible to obtain a lens element having a high refractive index.

The third lens unit G3, in order from the object side to the image side, comprises: a bi-convex seventh lens element L7; a bi-convex eighth lens element L8; a bi-concave ninth lens element L9; a bi-convex tenth lens element L10; and a negative meniscus eleventh lens element L11 with the convex surface facing the image side. Among these, the eighth lens element L8 and the ninth lens element L9 are cemented with each other, and the tenth lens element L10 and the eleventh lens element L11 are cemented with each other. The eighth lens element L8 has an aspheric object side surface. The tenth lens element L10 has an aspheric object side surface.

The fourth lens unit G4, in order from the object side to the image side, comprises: a positive meniscus twelfth lens element L12 with the convex surface facing the image side; and a bi-concave thirteenth lens element L13. The twelfth lens element L12 and the thirteenth lens element L13 are cemented with each other. The thirteenth lens element L13 has an aspheric image side surface.

The fifth lens unit G5, in order from the object side to the image side, comprises: a bi-convex fourteenth lens element L14; and a negative meniscus fifteenth lens element L15 with the convex surface facing the image side. The fourteenth lens element L14 and the fifteenth lens element L15 are cemented with each other. The fourteenth lens element L14 has an aspheric object side surface.

In zooming from a wide-angle limit to a telephoto limit at the time of image taking, the first lens unit G1 does not move, the second lens unit G2 moves to the image side, the aperture diaphragm A does not move, the third lens unit G3 moves to the object side, the fourth lens unit G4 moves to the object side with locus of a convex to the object side, and the fifth lens unit G5 does not move. That is, in zooming, the second lens unit G2, the third lens unit G3, and the fourth lens unit G4 individually move along the optical axis so that the interval between the first lens unit G1 and the second lens unit G2 increases, the interval between the second lens unit G2 and the third lens unit G3 decreases, and the interval between the fourth lens unit G4 and the fifth lens unit G5 increases.

In focusing from an infinity in-focus condition to a close-object in-focus condition, the fourth lens unit G4 moves to the image side along the optical axis.

The tenth lens element L10 and the eleventh lens element L11 which are parts of the third lens unit G3 correspond to an image blur compensating lens unit described later. By moving the tenth lens element L10 and the eleventh lens element L11 in a direction perpendicular to the optical axis, image point movement caused by vibration of the entire system can be compensated, that is, image blur caused by hand blur, vibration, and the like can be compensated optically.

(Embodiment 2)

Figure 4:
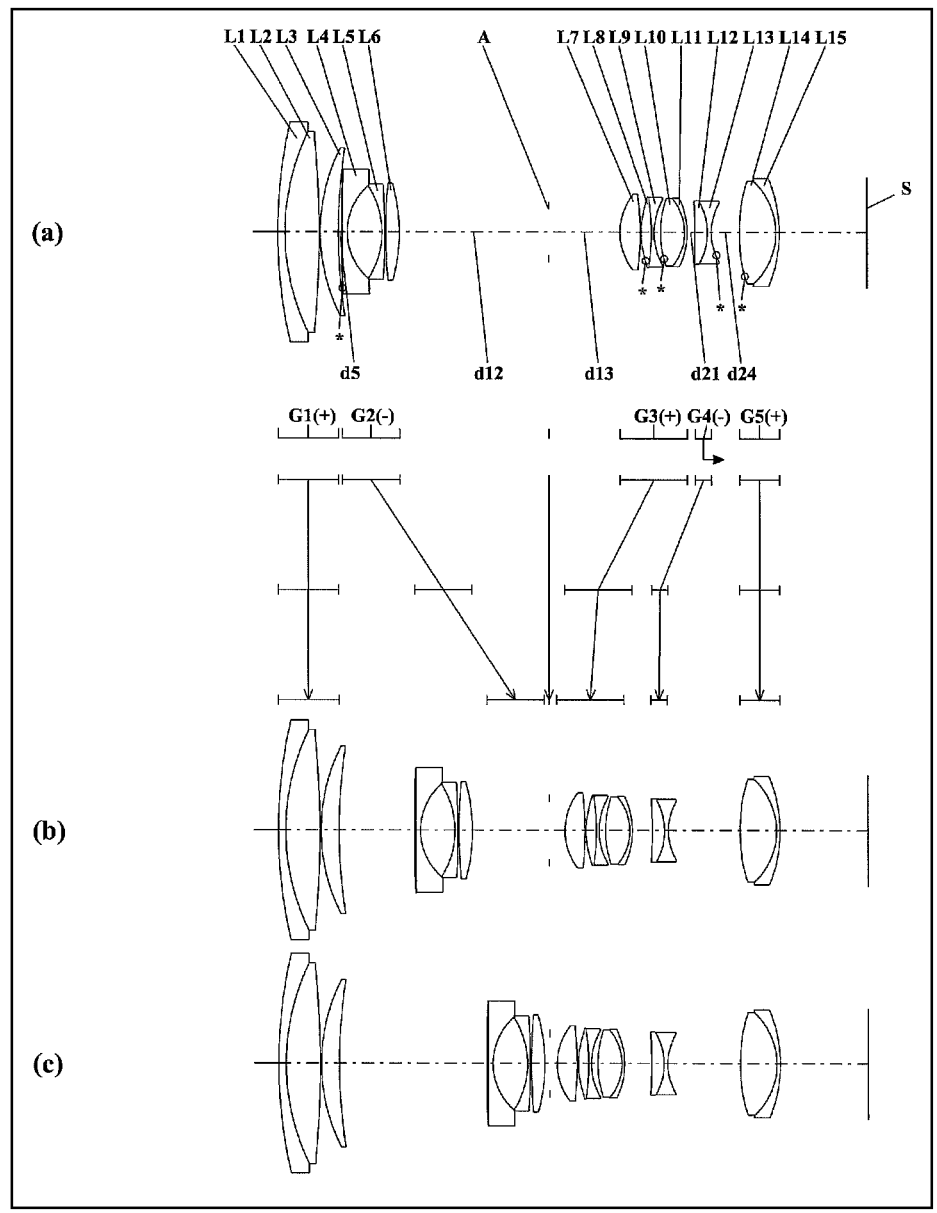
FIG. 4 is a lens arrangement diagram showing an infinity in-focus condition of a zoom lens system according to Embodiment 2 (Numerical Example 2)
Figure 5:
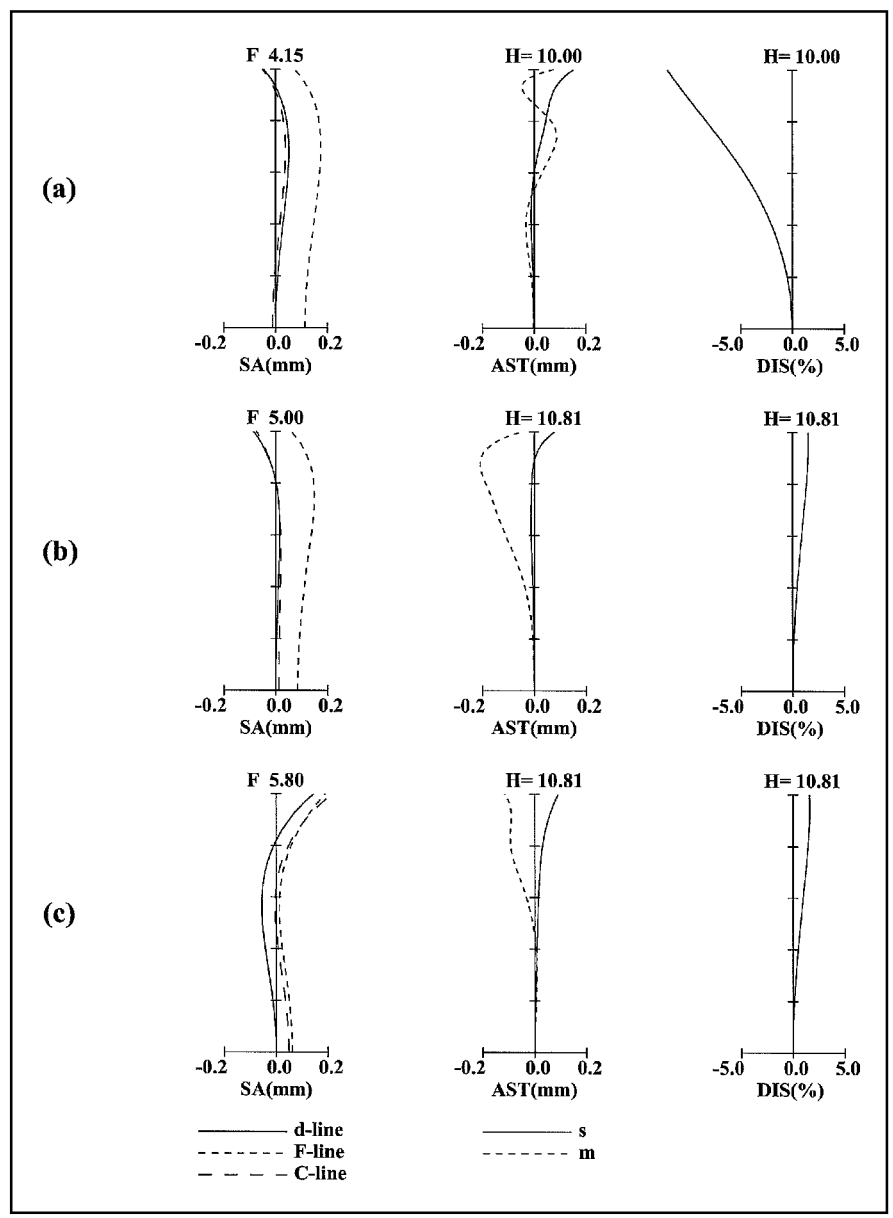
FIG. 5 is a longitudinal aberration diagram of an infinity in-focus condition of a zoom lens system according to Numerical Example 2.
Figure 6:
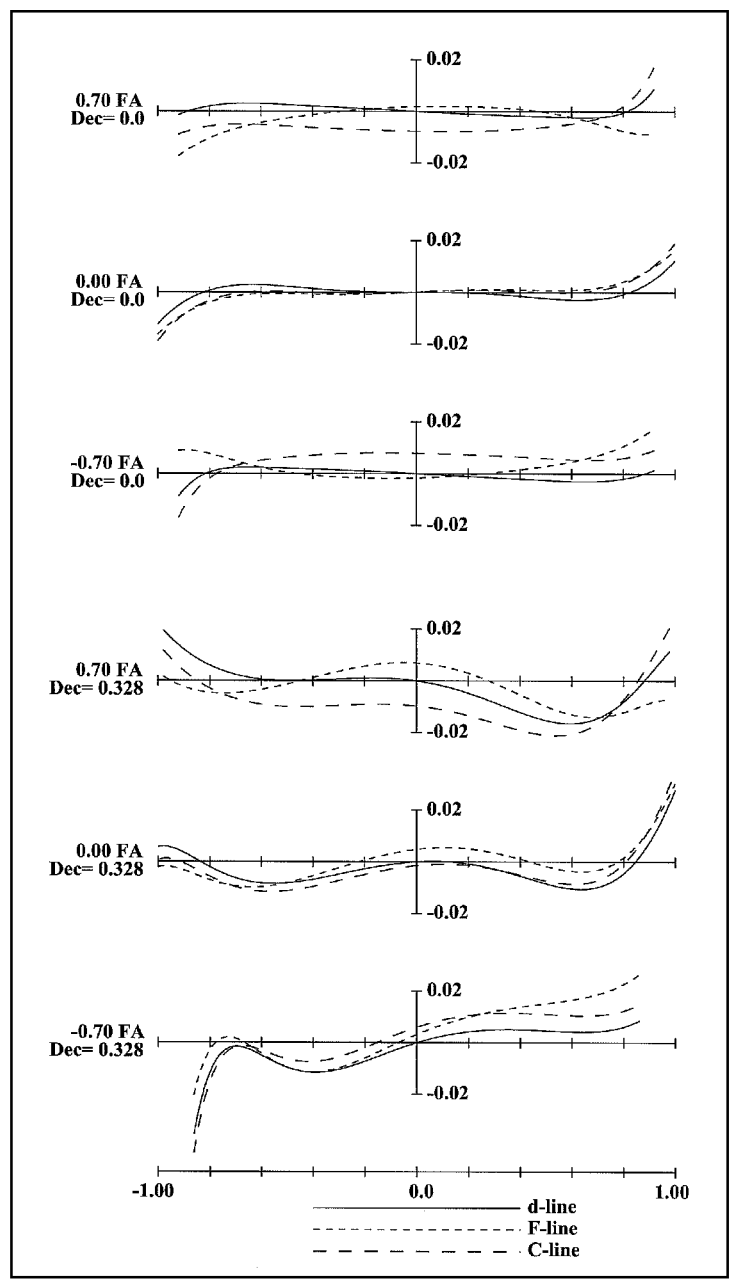
FIG. 6 is a lateral aberration diagram of a zoom lens system according to Numerical Example 2 at a telephoto limit in a basic state where image blur compensation is not performed and in an image blur compensation state.

As shown in FIG. 4, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

The second lens unit G2, in order from the object side to the image side, comprises: a negative meniscus fourth lens element L4 with the convex surface facing the object side; a negative meniscus fifth lens element L5 with the convex surface facing the image side; and a bi-convex sixth lens element L6. The fourth lens element L4 is a hybrid lens element comprising: a lens element formed of a glass material; and a bi-concave transparent resin layer which is formed of an ultraviolet curable resin and is cemented to an object side surface of the lens element. The fourth lens element L4 has an aspheric object side surface.

The third lens unit G3, in order from the object side to the image side, comprises: a bi-convex seventh lens element L7; a bi-convex eighth lens element L8; a bi-concave ninth lens element L9; a bi-convex tenth lens element L10; and a negative meniscus eleventh lens element L11 with the convex surface facing the image side. Among these, the eighth lens element L8 and the ninth lens element L9 are cemented with each other, and the tenth lens element L10 and the eleventh lens element L11 are cemented with each other. The eighth lens element L8 has an aspheric object side surface. The tenth lens element L10 has an aspheric object side surface.

The fourth lens unit G4, in order from the object side to the image side, comprises: a positive meniscus twelfth lens element L12 with the convex surface facing the image side; and a bi-concave thirteenth lens element L13. The twelfth lens element L12 and the thirteenth lens element L13 are cemented with each other. The thirteenth lens element L13 has an aspheric image side surface.

The fifth lens unit G5, in order from the object side to the image side, comprises: a bi-convex fourteenth lens element L14; and a negative meniscus fifteenth lens element L15 with the convex surface facing the image side. The fourteenth lens element L14 and the fifteenth lens element L15 are cemented with each other. The fourteenth lens element L14 has an aspheric object side surface.

In zooming from a wide-angle limit to a telephoto limit at the time of image taking, the first lens unit G1 does not move, the second lens unit G2 moves to the image side, the aperture diaphragm A does not move, the third lens unit G3 moves to the object side, the fourth lens unit G4 moves to the object side, and the fifth lens unit G5 does not move. That is, in zooming, the second lens unit G2, the third lens unit G3, and the fourth lens unit G4 individually move along the optical axis so that the interval between the first lens unit G1 and the second lens unit G2 increases, the interval between the second lens unit G2 and the third lens unit G3 decreases, and the interval between the fourth lens unit G4 and the fifth lens unit G5 increases.

In focusing from an infinity in-focus condition to a close-object in-focus condition, the fourth lens unit G4 moves to the image side along the optical axis.

The tenth lens element L10 and the eleventh lens element L11 which are parts of the third lens unit G3 correspond to an image blur compensating lens unit described later. By moving the tenth lens element L10 and the eleventh lens element L11 in a direction perpendicular to the optical axis, image point movement caused by vibration of the entire system can be compensated, that is, image blur caused by hand blur, vibration, and the like can be compensated optically.

(Embodiment 3)

As shown in FIG. 7, the first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 are cemented with each other. The second lens element L2 has an aspheric image side surface.

The second lens unit G2, in order from the object side to the image side, comprises: a negative meniscus third lens element L3 with the convex surface facing the object side; a bi-concave fourth lens element L4; and a bi-convex fifth lens element L5. The third lens element L3 is a hybrid lens element comprising: a lens element formed of a glass material; and a bi-concave transparent resin layer which is formed of an ultraviolet curable resin and is cemented to an object side surface of the lens element. The third lens element L3 has an aspheric object side surface.

The third lens unit G3 comprises solely a positive meniscus sixth lens element L6 with the convex surface facing the object side.

The fourth lens unit G4, in order from the object side to the image side, comprises: a bi-convex seventh lens element L7; a bi-convex eighth lens element L8; a bi-concave ninth lens element L9; and a bi-convex tenth lens element L10. Among these, the eighth lens element L8 and the ninth lens element L9 are cemented with each other. The seventh lens element L7 has two aspheric surfaces. The tenth lens element L10 has two aspheric surfaces.

The fifth lens unit G5, in order from the object side to the image side, comprises: a positive meniscus eleventh lens element L11 with the convex surface facing the image side; and a bi-concave twelfth lens element L12. The eleventh lens element L11 and the twelfth lens element L12 are cemented with each other. The twelfth lens element L12 has an aspheric image side surface.

The sixth lens unit G6 comprises solely a bi-convex thirteenth lens element L13. The thirteenth lens element L13 has two aspheric surfaces.

In zooming from a wide-angle limit to a telephoto limit at the time of image taking, the first lens unit G1 does not move, the second lens unit G2 moves to the image side, the aperture diaphragm A does not move, the third lens unit G3 does not move, the fourth lens unit G4 moves to the object side, the fifth lens unit G5 moves to the object side with locus of a convex to the object side, and the sixth lens unit G6 does not move. That is, in zooming, the second lens unit G2, the fourth lens unit G4, and the fifth lens unit G5 individually move along the optical axis so that the interval between the first lens unit G1 and the second lens unit G2 increases, the interval between the second lens unit G2 and the third lens unit G3 decreases, the interval between the third lens unit G3 and the fourth lens unit G4 decreases, and the interval between the fifth lens unit G5 and the sixth lens unit G6 increases.

In focusing from an infinity in-focus condition to a close-object in-focus condition, the fifth lens unit G5 moves to the image side along the optical axis.

The tenth lens element L10 which is a part of the fourth lens unit G4 corresponds to an image blur compensating lens unit described later. By moving the tenth lens element L10 in a direction perpendicular to the optical axis, image point movement caused by vibration of the entire system can be compensated, that is, image blur caused by hand blur, vibration, and the like can be compensated optically.

(Embodiment 4)

As shown in FIG. 10, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. The second lens element L2 is a hybrid lens element comprising: a lens element formed of a glass material; and a positive meniscus transparent resin layer with the convex surface facing the image side, which is formed of an ultraviolet curable resin and is cemented to an image side surface of the lens element. The second lens element L2 has an aspheric image side surface.

The second lens unit G2, in order from the object side to the image side, comprises: a bi-concave third lens element L3; a bi-concave fourth lens element L4; and a bi-convex fifth lens element L5. The third lens element L3 is a hybrid lens element comprising: a lens element formed of a glass material; and a negative meniscus transparent resin layer with the convex surface facing the image side, which is formed of an ultraviolet curable resin and is cemented to an object side surface of the lens element. The third lens element L3 has an aspheric object side surface.

The third lens unit G3 comprises solely a bi-convex sixth lens element L6.

The fourth lens unit G4, in order from the object side to the image side, comprises: a bi-convex seventh lens element L7; a bi-convex eighth lens element L8; a bi-concave ninth lens element L9; a bi-convex tenth lens element L10; and a negative meniscus eleventh lens element L11 with the convex surface facing the image side. Among these, the eighth lens element L8 and the ninth lens element L9 are cemented with each other, and the tenth lens element L10 and the eleventh lens element L11 are cemented with each other. The seventh lens element L7 has two aspheric surfaces. The tenth lens element L10 has an aspheric object side surface.

The fifth lens unit G5, in order from the object side to the image side, comprises: a bi-convex twelfth lens element L12; and a bi-concave thirteenth lens element L13. The twelfth lens element L12 and the thirteenth lens element L13 are cemented with each other. The thirteenth lens element L13 has an aspheric image side surface.

The sixth lens unit G6, in order from the object side to the image side, comprises: a bi-convex fourteenth lens element L14; and a negative meniscus fifteenth lens element L15 with the convex surface facing the image side. The fourteenth lens element L14 and the fifteenth lens element L15 are cemented with each other. The fourteenth lens element L14 has an aspheric object side surface.

In zooming from a wide-angle limit to a telephoto limit at the time of image taking, the first lens unit G1 does not move, the second lens unit G2 moves to the image side, the aperture diaphragm A does not move, the third lens unit G3 does not move, the fourth lens unit G4 moves to the object side, the fifth lens unit G5 moves to the object side with locus of a convex to the object side, and the sixth lens unit G6 does not move. That is, in zooming, the second lens unit G2, the fourth lens unit G4, and the fifth lens unit G5 individually move along the optical axis so that the interval between the first lens unit G1 and the second lens unit G2 increases, the interval between the second lens unit G2 and the third lens unit G3 decreases, the interval between the third lens unit G3 and the fourth lens unit G4 decreases, and the interval between the fifth lens unit G5 and the sixth lens unit G6 increases.

In focusing from an infinity in-focus condition to a close-object in-focus condition, the fifth lens unit G5 moves to the image side along the optical axis.

The tenth lens element L10 and the eleventh lens element L11 which are parts of the fourth lens unit G4 correspond to an image blur compensating lens unit described later. By moving the tenth lens element L10 and the eleventh lens element L11 in a direction perpendicular to the optical axis, image point movement caused by vibration of the entire system can be compensated, that is, image blur caused by hand blur, vibration, and the like can be compensated optically.

(Embodiment 5)

As shown in FIG. 13, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other.

The second lens unit G2, in order from the object side to the image side, comprises: a negative meniscus fourth lens element L4 with the convex surface facing the object side; a bi-concave fifth lens element L5; and a bi-convex sixth lens element L6. The fourth lens element L4 is a hybrid lens element comprising: a lens element formed of a glass material; and a negative meniscus transparent resin layer with the convex surface facing the object side, which is formed of an ultraviolet curable resin and is cemented to an object side surface of the lens element. The fourth lens element L4 has an aspheric object side surface.

The third lens unit G3 comprises solely a bi-convex seventh lens element L7.

The fourth lens unit G4, in order from the object side to the image side, comprises: a bi-convex eighth lens element L8; a bi-convex ninth lens element L9; a bi-concave tenth lens element L10; a bi-convex eleventh lens element L11; and a negative meniscus twelfth lens element L12 with the convex surface facing the image side. Among these, the ninth lens element L9 and the tenth lens element L10 are cemented with each other, and the eleventh lens element L11 and the twelfth lens element L12 are cemented with each other. The ninth lens element L9 has an aspheric object side surface. The eleventh lens element L11 has an aspheric object side surface.

The fifth lens unit G5, in order from the object side to the image side, comprises: a positive meniscus thirteenth lens element L13 with the convex surface facing the image side; and a bi-concave fourteenth lens element L14. The thirteenth lens element L13 and the fourteenth lens element L14 are cemented with each other. The fourteenth lens element L14 has an aspheric image side surface.

The sixth lens unit G6, in order from the object side to the image side, comprises: a bi-convex fifteenth lens element L15; and a negative meniscus sixteenth lens element L16 with the convex surface facing the image side. The fifteenth lens element L15 and the sixteenth lens element L16 are cemented with each other. The fifteenth lens element L15 has an aspheric object side surface.

In zooming from a wide-angle limit to a telephoto limit at the time of image taking, the first lens unit G1 does not move, the second lens unit G2 moves to the image side, the aperture diaphragm A does not move, the third lens unit G3 does not move, the fourth lens unit G4 moves to the object side, the fifth lens unit G5 moves to the object side, and the sixth lens unit G6 does not move. That is, in zooming, the second lens unit G2, the fourth lens unit G4, and the fifth lens unit G5 individually move along the optical axis so that the interval between the first lens unit G1 and the second lens unit G2 increases, the interval between the second lens unit G2 and the third lens unit G3 decreases, the interval between the third lens unit G3 and the fourth lens unit G4 decreases, and the interval between the fifth lens unit G5 and the sixth lens unit G6 increases.

In focusing from an infinity in-focus condition to a close-object in-focus condition, the fifth lens unit G5 moves to the image side along the optical axis.

The eleventh lens element L11 and the twelfth lens element L12 which are parts of the fourth lens unit G4 correspond to an image blur compensating lens unit described later. By moving the eleventh lens element L11 and the twelfth lens element L12 in a direction perpendicular to the optical axis, image point movement caused by vibration of the entire system can be compensated, that is, image blur caused by hand blur, vibration, and the like can be compensated optically.

As described above, Embodiments 1 to 5 have been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

The following description is given for conditions that a zoom lens system like the zoom lens systems according to Embodiments 1 to 5 can satisfy. Here, a plurality of beneficial conditions is set forth for the zoom lens system according to each embodiment. A construction that satisfies all the plurality of conditions is most effective for the zoom lens system. However, when an individual condition is satisfied, a zoom lens system having the corresponding effect is obtained.

For example, in a zoom lens system like the zoom lens systems according to Embodiments 1 to 5, having at least five lens units, each lens unit being composed of at least one lens element, and in order from an object side to an image side, comprising: a first lens unit having positive optical power; and a second lens unit having negative optical power, and in order from the image side to the object side, comprising: a lens unit γ having positive optical power; a lens unit β having negative optical power; and a lens unit α having positive optical power, in which the first lens unit is composed of only optical elements having optical power, and in zooming from a wide-angle limit to a telephoto limit at a time of image taking, at least the first lens unit is fixed with respect to an image surface, the lens unit α moves with respect to the image surface separately from an aperture diaphragm, and the lens unit β moves to the object side (this lens configuration is referred to as a basic configuration of the embodiments, hereinafter), it is beneficial that the following condition (1) is satisfied.

$$0.5 < f_W/T_{1G} < 3.0 \quad (1)$$

where, $f_W$ is a focal length of the zoom lens system at the wide-angle limit, and $T_{1G}$ is an optical axial thickness of the first lens unit.

The condition (1) sets forth the relationship between the focal length of the entire zoom lens system at the wide-angle limit, and the optical axial thickness of the first lens unit. When the value goes below the lower limit of the condition (1), the optical axial thickness of the first lens unit becomes excessively large, which makes it difficult to compensate astigmatism at the wide-angle limit. When the value exceeds the upper limit of the condition (1), the optical axial thickness of the first lens unit becomes excessively small, which makes it difficult to compensate magnification chromatic aberration at the telephoto limit.

When at least one of the following conditions (1)' and (1)" is satisfied, the above-mentioned effect is achieved more successfully.

$$0.8 < f_W/T_{1G} \quad (1)'$$

$$f_W/T_{1G} < 2.0 \quad (1)''$$

It is beneficial that a zoom lens system having the basic configuration like the zoom lens systems according to Embodiments 1 to 5 satisfies the following condition (2).

$$0.4 < Y_T/T_{1G} < 3.0 \quad (2)$$

where, $Y_T$ is an image height at the telephoto limit, and $T_{1G}$ is an optical axial thickness of the first lens unit.

The condition (2) sets forth the relationship between the image height at the telephoto limit, and the optical axial thickness of the first lens unit. When the value goes below the lower limit of the condition (2), the optical axial thickness of the first lens unit becomes excessively large, which makes it difficult to compensate astigmatism at the wide-angle limit. When the value exceeds the upper limit of the condition (2), the optical axial thickness of the first lens unit becomes excessively small, which makes it difficult to compensate magnification chromatic aberration at the telephoto limit.

When at least one of the following conditions (2)' and (2)" is satisfied, the above-mentioned effect is achieved more successfully.

$$0.7 < Y_T/T_{1G} \quad (2)'$$

$$Y_T/T_{1G} < 1.8 \quad (2)''$$

It is beneficial that a zoom lens system having the basic configuration like the zoom lens systems according to Embodiments 1 to 5 satisfies the following condition (3).

$$0.3 < f_W/T_{\gamma G} < 7.0 \quad (3)$$

where, $f_W$ is a focal length of the zoom lens system at the wide-angle limit, and $T_{\gamma G}$ is an optical axial thickness of the lens unit γ.

The condition (3) sets forth the relationship between the focal length of the entire zoom lens system at the wide-angle limit, and the optical axial thickness of the lens unit γ. When the value goes below the lower limit of the condition (3), the optical axial thickness of the lens unit γ becomes excessively large relative to the focal length of the entire zoom lens system at the wide-angle limit, which makes it difficult to compensate astigmatism at the wide-angle limit. Further, it becomes difficult to provide a compact lens barrel, interchangeable lens apparatus, or camera system. When the value exceeds the upper limit of the condition (3), the optical axial thickness of the lens unit γ becomes excessively small, which makes it difficult to compensate astigmatism at the telephoto limit.

When at least one of the following conditions (3)' and (3)" is satisfied, the above-mentioned effect is achieved more successfully.

$$1.0 < f_W/T_{\gamma G} \quad (3)'$$

$$f_W/T_{\gamma G} < 5.0 \quad (3)''$$

It is beneficial that a zoom lens system having the basic configuration like the zoom lens systems according to Embodiments 1 to 5 satisfies the following condition (4).

$$0.2 < Y_T/T_{\gamma G} < 6.0 \quad (4)$$

where, $Y_T$ is an image height at the telephoto limit, and $T_{\gamma G}$ is an optical axial thickness of the lens unit γ.

The condition (4) sets forth the relationship between the image height at the telephoto limit, and the optical axial thickness of the lens unit γ. When the value goes below the lower limit of the condition (4), the optical axial thickness of the lens unit γ becomes excessively large, which makes it difficult to compensate astigmatism at the wide-angle limit. Further, it becomes difficult to provide a compact lens barrel, interchangeable lens apparatus, or camera system. When the value exceeds the upper limit of the condition (4), the optical axial thickness of the lens unit γ becomes excessively small, which makes it difficult to compensate astigmatism at the telephoto limit.

When at least one of the following conditions (4)' and (4)" is satisfied, the above-mentioned effect is achieved more successfully.

$$1.2 < Y_T T_{\gamma G} \quad (4)'$$

$$Y_T/T_{\gamma G} < 3.0 \quad (4)''$$

It is beneficial that a zoom lens system having the basic configuration like the zoom lens systems according to Embodiments 1 to 5 satisfies the following condition (5).

$$4.0 < f_W/T_{air1G2GW} < 350.0 \quad (5)$$

where, $f_W$ is a focal length of the zoom lens system at the wide-angle limit, and $T_{air1G2GW}$ is an air space between the first lens unit and the second lens unit at the wide-angle limit.

The condition (5) sets forth the relationship between the focal length of the entire zoom lens system at the wide-angle limit, and the air space between the first lens unit and the second lens unit at the wide-angle limit. When the value goes below the lower limit of the condition (5), the air space between the first lens unit and the second lens unit at the wide-angle limit becomes excessively large, which makes it difficult to compensate curvature of field at the wide-angle limit. When the value exceeds the upper limit of the condition (5), the focal length of the entire zoom lens system at the wide-angle limit becomes excessively long, which results in an insufficient imaging range at the wide-angle limit. Further, it becomes difficult to provide a compact lens barrel, interchangeable lens apparatus, or camera system.

When at least one of the following conditions (5)' and (5)" is satisfied, the above-mentioned effect is achieved more successfully.

$$15.0 < f_W / T_{air1G2GW} \qquad (5)'$$

$$f_W / T_{air1G2GW} < 20.0 \qquad (5)''$$

It is beneficial that a zoom lens system having the basic configuration like the zoom lens systems according to Embodiments 1 to 5 satisfies the following condition (6).

$$nd_{1G} < 1.82 \qquad (6)$$

where, $nd_{1G}$ is a refractive index to the d-line of an optical element having the largest optical axial thickness among the optical elements constituting the first lens unit.

The condition (6) sets forth the refractive index to the d-line of the optical element having the largest optical axial thickness among the optical elements constituting the first lens unit. When the value exceeds the upper limit of the condition (6), it becomes difficult to compensate magnification chromatic aberration at the telephoto limit.

When the following condition (6)' is satisfied, the above-mentioned effect is achieved more successfully.

$$nd_{1G} < 1.65 \qquad (6)'$$

It is beneficial that a zoom lens system having the basic configuration like the zoom lens systems according to Embodiments 1 to 5 satisfies the following condition (7).

$$48 < vd_{1G} \qquad (7)$$

where, $vd_{1G}$ is an Abbe number to the d-line of an optical element having the largest optical axial thickness among the optical elements constituting the first lens unit.

The condition (7) sets forth the Abbe number to the d-line of the optical element having the largest optical axial thickness among the optical elements constituting the first lens unit. When the value goes below the lower limit of the condition (7), it becomes difficult to compensate magnification chromatic aberration at the telephoto limit.

When the following condition (7)' is satisfied, the above-mentioned effect is achieved more successfully.

$$60 < vd_{1G} \qquad (7)'$$

It is beneficial that a zoom lens system having the basic configuration like the zoom lens systems according to Embodiments 1 to 5 satisfies the following condition (8).

$$0.7 < |M_{\alpha G} / M_{\beta G}| < 11.0 \qquad (8)$$

where, $M_{\alpha G}$ is an amount of movement of the lens unit α with respect to the image surface, in zooming from the wide-angle limit to the telephoto limit at the time of image taking, and $M_{\beta G}$ is an amount of movement of the lens unit β with respect to the image surface, in zooming from the wide-angle limit to the telephoto limit at the time of image taking The condition (8) sets forth the relationship between the amount of movement of the lens unit α and the amount of movement of the lens unit β, in zooming. When the value goes below the lower limit of the condition (8), contribution of the lens unit α to magnification change becomes excessively small, which makes it difficult to compensate spherical aberration at the telephoto limit. When the value exceeds the upper limit of the condition (8), contribution of the lens unit β to magnification change becomes excessively small, which makes it difficult to compensate astigmatism at the wide-angle limit.

When at least one of the following conditions (8)' and (8)" is satisfied, the above-mentioned effect is achieved more successfully.

$$1.1 < |M_{\alpha G} / M_{\beta G}| \qquad (8)'$$

$$|M_{\alpha G} / M_{\beta G}| < 4.0 \qquad (8)''$$

It is beneficial that a zoom lens system having the basic configuration like the zoom lens systems according to Embodiments 1 to 5 satisfies the following condition (9).

$$L_T / f_T < 1.45 \qquad (9)$$

where, $L_T$ is an overall length of the zoom lens system, that is a distance from a most object side surface of the first lens unit to the image surface, at the telephoto limit, and $f_T$ is a focal length of the zoom lens system at the telephoto limit.

The condition (9) sets forth the relationship between the overall length of the zoom lens system at the telephoto limit, and the focal length of the entire zoom lens system at the telephoto limit. When the value exceeds the upper limit of the condition (9), the overall length of the zoom lens lens system at the telephoto limit becomes excessively long, which makes it difficult to compensate fluctuation in astigmatism associated with zooming.

When the following condition (9)' is satisfied, the above-mentioned effect is achieved more successfully.

$$L_T / f_T < 1.25 \qquad (9)'$$

It is beneficial that a zoom lens system having the basic configuration like the zoom lens systems according to Embodiments 1 to 5 satisfies the following condition (10).

$$2.6 < (f_T / f_W) \times (\tan(\theta_W))^2 \qquad (10)$$

where, $f_T$ is a focal length of the zoom lens system at the telephoto limit, $f_W$ is a focal length of the zoom lens system at the wide-angle limit, and $\theta_W$ is a half view angle (°) at the wide-angle limit.

The condition (10) sets forth the relationship among the focal length of the entire zoom lens system at the telephoto limit, the focal length of the entire zoom lens system at the wide-angle limit, and the half view angle at the wide-angle limit. When the value goes below the lower limit of the condition (10), the half view angle at the wide-angle limit becomes excessively small, which results in an insufficient imaging range at the wide-angle limit. Further, it becomes difficult to compensate magnification chromatic aberration at the telephoto limit.

When the following condition (10)' is satisfied, the above-mentioned effect is achieved more successfully.

$$5.2 < (f_T / f_W) \times (\tan(\theta_W))^2 \qquad (10)'$$

It is beneficial that a zoom lens system having the basic configuration like the zoom lens systems according to Embodiments 1 to 5 satisfies the following condition (11).

$$0.02<|M_{\beta G}/f_W|<2.0 \tag{11}$$

where, $M_{\beta G}$ is an amount of movement of the lens unit β with respect to the image surface, in zooming from the wide-angle limit to the telephoto limit at the time of image taking, and $f_W$ is a focal length of the zoom lens system at the wide-angle limit.

The condition (11) sets forth the relationship between the amount of movement of the lens unit β in zooming, and the focal length of the entire zoom lens system at the wide-angle limit. When the value goes below the lower limit of the condition (11), contribution of the lens unit β to magnification change becomes excessively small, which makes it difficult to compensate astigmatism at the wide-angle limit. When the value exceeds the upper limit of the condition (11), contribution of the lens unit β to magnification change becomes excessively large, which makes it difficult to compensate spherical aberration at the telephoto limit.

When at least one of the following conditions (11)' and (11)" is satisfied, the above-mentioned effect is achieved more successfully.

$$0.5<|M_{\beta G}/f_W| \tag{11'}$$

$$|M_{\beta G}/f_W|<0.9 \tag{11"}$$

It is beneficial for a zoom lens system to be provided with an image blur compensating lens unit which moves in a direction perpendicular to the optical axis in order to optically compensate image blur, like the zoom lens systems according to Embodiments 1 to 5. By virtue of the image blur compensating lens unit, image point movement caused by vibration of the entire system can be compensated.

When compensating image point movement caused by vibration of the entire system, the image blur compensating lens unit moves in the direction perpendicular to the optical axis, so that image blur is compensated in a state that size increase in the entire zoom lens system is suppressed to realize a compact construction and that excellent imaging characteristics such as small decentering coma aberration and small decentering astigmatism are satisfied.

It is beneficial that the image blur compensating lens unit moves with respect to the image surface, in zooming from a wide-angle limit to a telephoto limit at the time of image taking When the image blur compensating lens unit does not move in zooming, the amount of movement of the image blur compensating lens unit in the direction perpendicular to the optical axis increases, which makes it difficult to compensate partial blur in the image blur compensation state. Further, the configuration of the drive mechanism for the image blur compensating lens unit is enlarged, which makes it difficult to provide a compact lens barrel, interchangeable lens apparatus, or camera system.

Further, it is beneficial that the image blur compensating lens unit is a part of any one of the lens units constituting the lens system. When the image blur compensating lens unit is the entirety of any one of the lens units constituting the lens system, the configuration of the drive mechanism for the image blur compensating lens unit is enlarged, which makes it difficult to provide a compact lens barrel, interchangeable lens apparatus, or camera system. The "part" of a lens unit may be a single lens element, or a plurality of lens elements adjacent to each other.

It is beneficial that the aperture diaphragm is fixed with respect to the image surface in zooming from a wide-angle limit to a telephoto limit at the time of image taking, like the zoom lens systems according to Embodiments 1 to 5. When the aperture diaphragm moves in zooming, it is difficult to secure an amount of peripheral light at the wide-angle limit. Further, it becomes difficult to provide a compact lens barrel, interchangeable lens apparatus, or camera system.

It is beneficial that the lens unit γ is fixed with respect to the image surface in zooming from a wide-angle limit to a telephoto limit at the time of image taking, like the zoom lens systems according to Embodiments 1 to 5. When the lens unit γ moves in zooming, it becomes difficult to compensate astigmatism at the telephoto limit.

It is beneficial that the number of the aperture diaphragm and lens units, that are fixed with respect to the image surface, is equal to the number of lens units that move with respect to the image surface like the zoom lens systems according to Embodiments 1 and 2, or the number of the lens units that are fixed with respect to the image surface is equal to the number of the lens units that move with respect to the image surface like the zoom lens systems according to Embodiments 3 to 5, in zooming from the wide-angle limit to the telephoto limit at the time of image taking When the total number of fixed aperture diaphragm and fixed lens units is different from the number of moving lens units, or when the number of fixed lens units is different from the number of moving lens units, it becomes difficult to compensate fluctuation in spherical aberration associated with zooming. Further, a problem occurs in designing a lens barrel, which makes it difficult to provide a compact lens barrel, interchangeable lens apparatus, or camera system.

It is beneficial that the lens unit β is moved along the optical axis direction to perform focusing from an infinity in-focus condition to a close-object in-focus condition, like the zoom lens systems according to Embodiments 1 to 5. When focusing is performed by using a lens unit other than the lens unit β, it becomes difficult to compensate astigmatism in the close-object in-focus condition.

Each of the lens units constituting the zoom lens system according to any of Embodiments 1 to 5 is composed exclusively of refractive type lens elements that deflect the incident light by refraction (that is, lens elements of a type in which deflection is achieved at the interface between media each having a distinct refractive index). However, the present invention is not limited to this. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium. In particular, in refractive-diffractive hybrid type lens elements, when a diffraction structure is formed in the interface between media having mutually different refractive indices, wavelength dependence in the diffraction efficiency is improved. Thus, such a configuration is beneficial.

(Embodiment 6)

Figure 16:
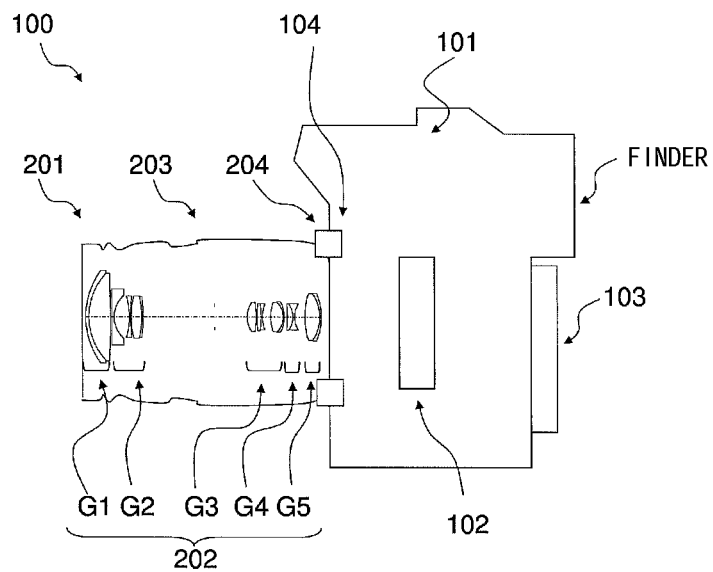
FIG. 16 is a schematic construction diagram of an interchangeable-lens type digital camera system according to Embodiment 6.

FIG. 16 is a schematic construction diagram of an interchangeable-lens type digital camera system according to Embodiment 6.

The interchangeable-lens type digital camera system 100 according to Embodiment 6 includes a camera body 101, and an interchangeable lens apparatus 201 which is detachably connected to the camera body 101.

The camera body 101 includes: an image sensor 102 which receives an optical image formed by a zoom lens system 202 of the interchangeable lens apparatus 201, and converts the optical image into an electric image signal; a liquid crystal monitor 103 which displays the image signal obtained by the image sensor 102; and a camera mount section 104. On the other hand, the interchangeable lens apparatus 201 includes: a zoom lens system 202 according to any of Embodiments 1 to 5; a lens barrel 203 which holds the zoom lens system 202; and a lens mount section 204 connected to the camera mount section 104 of the camera body 101. The camera mount section 104 and the lens mount section 204 are physically connected to each other. Moreover, the camera mount section 104 and the lens mount section 204 function as interfaces which allow the camera body 101 and the interchangeable lens apparatus 201 to exchange signals, by electrically connecting a controller (not shown) in the camera body 101 and a controller (not shown) in the interchangeable lens apparatus 201. In FIG. 16, the zoom lens system according to Embodiment 1 is employed as the zoom lens system 202.

In Embodiment 6, since the zoom lens system 202 according to any of Embodiments 1 to 5 is employed, a compact interchangeable lens apparatus having excellent imaging performance can be realized at low cost. Moreover, size reduction and cost reduction of the entire camera system 100 according to Embodiment 6 can be achieved. In the zoom lens systems according to Embodiments 1 to 5, the entire zooming range need not be used. That is, in accordance with a desired zooming range, a range where satisfactory optical performance is obtained may exclusively be used. Then, the zoom lens system may be used as one having a lower magnification than the zoom lens systems described in Embodiments 1 to 5.

As described above, Embodiment 6 has been described as an example of art disclosed in the present application. However, the art in the present disclosure is not limited to this embodiment. It is understood that various modifications, replacements, additions, omissions, and the like have been performed in this embodiment to give optional embodiments, and the art in the present disclosure can be applied to the optional embodiments.

The following description is given for numerical examples in which the zoom lens system according to Embodiments 1 to 5 are implemented practically. In the numerical examples, the units of the length in the tables are all "mm", while the units of the view angle are all "°". Moreover, in the numerical examples, r is the radius of curvature, d is the axial distance, nd is the refractive index to the d-line, and vd is the Abbe number to the d-line. In the numerical examples, the surfaces marked with * are aspheric surfaces, and the aspheric surface configuration is defined by the following expression.

$$Z = \frac{h^2/r}{1+\sqrt{1-(1+\kappa)(h/r)^2}} + \sum A_n h^n$$

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, κ is a conic constant, and $A_n$ is an n-th order aspherical coefficient.

FIGS. 2, 5, 8, 11, and 14 are longitudinal aberration diagrams of an infinity in-focus condition of the zoom lens systems according to Numerical Examples 1 to 5, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

FIGS. 3, 6, 9, 12, and 15 are lateral aberration diagrams of the zoom lens systems at a telephoto limit according to Numerical Examples 1 to 5, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the image blur compensating lens unit is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as, the plane containing the optical axis of the first lens unit G1 and the optical axis of the third lens unit G3 (Numerical Examples 1 and 2), or the plane containing the optical axis of the first lens unit G1 and the optical axis of the fourth lens unit G4 (Numerical Examples 3 to 5).

Here, in the zoom lens system according to each numerical example, the amount of movement of the image blur compensating lens unit in a direction perpendicular to the optical axis in an image blur compensation state at a telephoto limit is as follows.

| Numerical Example | Amount of movement (mm) |
|---|---|
| 1 | 0.249 |
| 2 | 0.328 |
| 3 | 0.280 |
| 4 | 0.375 |
| 5 | 0.339 |

Here, when the shooting distance is infinity, at a telephoto limit, the amount of image decentering in a case that the zoom lens system inclines by 0.5° is equal to the amount of image decentering in a case that the image blur compensating lens unit displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to at least 0.5° without degrading the imaging characteristics.

(Numerical Example 1)

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows the various data.

TABLE 1

(Surface data)

| Surface number | r | d | nd | vd |
|---|---|---|---|---|
| Object surface | ∞ | | | |
| 1 | 38.26700 | 1.50000 | 1.94391 | 25.2 |
| 2 | 30.74450 | 10.48520 | 1.55332 | 71.7 |
| 3* | −356.27340 | Variable | | |
| 4* | −169.44210 | 0.10000 | 1.51358 | 51.6 |
| 5 | −649.98740 | 1.00000 | 1.91082 | 35.2 |
| 6 | 14.10850 | 7.35240 | | |
| 7 | −32.03880 | 0.60000 | 1.91082 | 35.2 |
| 8 | 124.13720 | 0.20000 | | |
| 9 | 43.98420 | 5.06110 | 1.94595 | 18.0 |
| 10 | −47.05720 | 0.55000 | 1.91082 | 35.2 |
| 11 | −105.08590 | Variable | | |
| 12 (Diaphragm) | ∞ | Variable | | |
| 13 | 13.13340 | 4.29530 | 1.54757 | 46.2 |
| 14 | −36.48530 | 0.20000 | | |
| 15* | 28.50810 | 2.22860 | 1.58313 | 59.5 |
| 16 | −33.94420 | 0.55000 | 1.91082 | 35.2 |
| 17 | 16.10430 | 3.93280 | | |
| 18* | 17.55000 | 6.16360 | 1.58913 | 61.3 |
| 19 | −10.06250 | 0.50000 | 1.84666 | 23.8 |
| 20 | −15.67220 | Variable | | |
| 21 | −49.38110 | 2.59760 | 1.99537 | 20.6 |
| 22 | −11.02690 | 0.80000 | 1.88202 | 37.2 |
| 23* | 11.67600 | Variable | | |
| 24* | 41.86890 | 7.23900 | 1.58913 | 61.3 |
| 25 | −19.12900 | 0.70000 | 1.98162 | 29.5 |
| 26 | −29.28990 | (BF) | | |
| Image surface | ∞ | | | |

TABLE 2

(Aspherical data)

Surface No. 3

K = 0.00000E+00, A4 = 1.38459E−06, A6 = −7.07527E−10,
A8 = 8.06553E−13 A10 = −5.96314E−16

Surface No. 4

K = 0.00000E+00, A4 = 2.11825E−05, A6 = −1.09394E−07,
A8 = 5.35730E−10 A10 = −1.16920E−12

TABLE 2-continued (Aspherical data)

Surface No. 15

K = 0.00000E+00, A4 = −7.12761E−05, A6 = −5.93385E−07,
A8 = −3.61088E−09 A10 = 1.71311E−11

Surface No. 18

K = 0.00000E+00, A4 = −6.97061E−05, A6 = 6.71417E−08,
A8 = −7.80241E−10 A10 = 1.83379E−11

Surface No. 23

K = 0.00000E+00, A4 = −2.66182E−05, A6 = −3.17290E−07,
A8 = −2.35680E−11 A10 = 8.15377E−11

Surface No. 24

K = 0.00000E+00, A4 = 7.62364E−06, A6 = 1.57830E−08,
A8 = 8.23188E−11 A10 = −2.12223E−13

TABLE 3

(Various data)
Zooming ratio 7.76981

| | Wide-angle limit | Middle position | Telephoto limit |
|---|---|---|---|
| Focal length | 12.4203 | 34.6205 | 96.5032 |
| F-number | 4.00036 | 5.00034 | 5.80030 |
| Half view angle | 42.1346 | 17.3551 | 6.2652 |
| Image height | 10.0001 | 10.8150 | 10.8150 |
| BF | 18.0000 | 18.0000 | 18.0000 |
| d3 | 0.7000 | 17.6870 | 34.5875 |
| d11 | 34.8894 | 17.9019 | 1.0000 |
| d12 | 15.7802 | 3.8580 | 2.0198 |
| d20 | 1.6000 | 3.8322 | 6.6347 |
| d23 | 4.9748 | 14.6653 | 13.7024 |
| Entrance pupil position | 26.3007 | 66.9820 | 147.3127 |
| Exit pupil position | −80.0580 | −117.0778 | −101.1309 |
| Front principal points position | 36.7921 | 91.3597 | 151.7382 |
| Back principal points position | 119.4977 | 97.3185 | 35.5070 |

Zoom lens unit data

| Lens unit | Initial surface No. | Focal length | Overall length of lens unit | Front principal points position | Back principal points position |
|---|---|---|---|---|---|
| 1 | 1 | 73.53274 | 11.98520 | 0.14570 | 4.52812 |
| 2 | 4 | −13.95555 | 14.86350 | 0.41057 | 3.42055 |
| 3 | 13 | 17.10688 | 17.87030 | 8.41804 | 8.94676 |
| 4 | 21 | −11.43637 | 3.39760 | 1.33394 | 3.05080 |
| 5 | 24 | 38.03094 | 7.93900 | 2.74375 | 5.57027 |

(Numerical Example 2)

The zoom lens system of Numerical Example 2 corresponds to Embodiment 2 shown in FIG. 4. Table 4 shows the surface data of the zoom lens system of Numerical Example 2. Table 5 shows the aspherical data. Table 6 shows the various data.

TABLE 4

(Surface data)

| Surface number | r | d | nd | vd |
|---|---|---|---|---|
| Object surface | ∞ | | | |
| 1 | 99.56160 | 1.50000 | 1.84666 | 23.8 |
| 2 | 46.82690 | 6.93280 | 1.49700 | 81.6 |
| 3 | −199.97720 | 0.20000 | | |
| 4 | 37.69630 | 3.67140 | 1.80420 | 46.5 |
| 5 | 109.92730 | Variable | | |
| 6* | −283.49550 | 0.10000 | 1.51358 | 51.6 |
| 7 | 513.42970 | 1.00000 | 1.91082 | 35.2 |
| 8 | 12.57360 | 7.03020 | | |
| 9 | −17.58990 | 0.60000 | 1.88300 | 40.8 |
| 10 | −149.01940 | 0.20000 | | |
| 11 | 105.12420 | 2.75420 | 1.95906 | 17.5 |
| 12 | −35.91880 | Variable | | |
| 13 (Diaphragm) | ∞ | Variable | | |
| 14 | 12.50450 | 4.09250 | 1.54814 | 45.8 |
| 15 | −60.06770 | 0.20000 | | |
| 16* | 17.41210 | 2.10170 | 1.58313 | 59.5 |
| 17 | −47.06420 | 0.55000 | 1.91082 | 35.2 |
| 18 | 13.53290 | 1.30000 | | |
| 19* | 19.22830 | 4.91640 | 1.58913 | 61.3 |
| 20 | −10.73890 | 0.50000 | 1.84666 | 23.8 |
| 21 | −16.45450 | Variable | | |
| 22 | −119.28210 | 2.52200 | 1.92286 | 20.9 |
| 23 | −12.93290 | 0.80000 | 1.88202 | 37.2 |
| 24* | 12.03630 | Variable | | |
| 25* | 42.92310 | 7.42380 | 1.58913 | 61.3 |
| 26 | −14.24340 | 0.70000 | 1.90366 | 31.3 |
| 27 | −28.74560 | (BF) | | |
| Image surface | ∞ | | | |

TABLE 5

(Aspherical data)

Surface No. 6

K = 0.00000E+00, A4 = 3.87195E−05, A6 = −2.57784E−07,
A8 = 1.12371E−09 A10 = −2.25069E−12

Surface No. 16

K = 0.00000E+00, A4 = −6.09744E−05, A6 = −6.48449E−07,
A8 = −8.54942E−09 A10 = 4.94395E−11

Surface No. 19

K = 0.00000E+00, A4 = −7.56525E−05, A6 = 3.04293E−08,
A8 = 1.12710E−08 A10 = −1.71193E−10

Surface No. 24

K = 0.00000E+00, A4 = −1.92125E−05, A6 = −5.49351E−07,
A8 = 1.14022E−08 A10 = −2.22955E−10

Surface No. 25

K = 0.00000E+00, A4 = 1.88062E−05, A6 = 9.27720E−08,
A8 = −6.08728E−10 A10 = 3.34374E−12

TABLE 6

(Various data)
Zooming ratio 9.32217

| | Wide-angle limit | Middle position | Telephoto limit |
|---|---|---|---|
| Focal length | 12.4210 | 37.9234 | 115.7911 |
| F-number | 4.15081 | 5.00058 | 5.80043 |
| Half view angle | 42.4899 | 15.6940 | 5.2536 |
| Image height | 10.0000 | 10.8150 | 10.8150 |
| BF | 18.0000 | 18.0000 | 18.0000 |
| d5 | 0.7000 | 15.4112 | 30.0730 |
| d12 | 30.3665 | 15.6572 | 1.0000 |
| d13 | 14.4786 | 3.1429 | 1.5024 |
| d21 | 1.6000 | 4.0645 | 5.5232 |
| d24 | 5.7284 | 14.5977 | 14.7749 |
| Entrance pupil position | 23.3189 | 59.1444 | 140.2741 |
| Exit pupil position | −67.3640 | −82.0431 | −81.0105 |
| Front principal points position | 33.4475 | 79.5322 | 90.5255 |
| Back principal points position | 107.4836 | 82.0171 | 4.1600 |

Zoom lens unit data

| Lens unit | Initial surface No. | Focal length | Overall length of lens unit | Front principal points position | Back principal points position |
|---|---|---|---|---|---|
| 1 | 1 | 56.33584 | 12.30420 | 4.17112 | 8.77022 |
| 2 | 6 | −12.71861 | 11.68440 | 0.39689 | 1.88675 |
| 3 | 14 | 15.99151 | 13.66060 | 3.93495 | 6.53586 |
| 4 | 22 | −12.70444 | 3.32200 | 1.56255 | 3.16853 |
| 5 | 25 | 44.32677 | 8.12380 | 2.50226 | 5.39475 |

(Numerical Example 3)

The zoom lens system of Numerical Example 3 corresponds to Embodiment 3 shown in FIG. 7. Table 7 shows the surface data of the zoom lens system of Numerical Example 3. Table 8 shows the aspherical data. Table 9 shows the various data.

TABLE 7

(Surface data)

| Surface number | r | d | nd | vd |
|---|---|---|---|---|
| Object surface | ∞ | | | |
| 1 | 37.98450 | 1.50000 | 1.94595 | 18.0 |
| 2 | 29.34750 | 7.51760 | 1.77200 | 50.0 |
| 3* | 432.80370 | Variable | | |
| 4* | −201.29530 | 0.10000 | 1.51358 | 51.6 |
| 5 | 2129.91050 | 1.00000 | 1.91082 | 35.2 |
| 6 | 11.92140 | 5.50030 | | |
| 7 | −40.82760 | 0.60000 | 1.88300 | 40.8 |
| 8 | 44.14840 | 0.20000 | | |
| 9 | 28.06360 | 2.57340 | 1.95906 | 17.5 |
| 10 | −422.15000 | Variable | | |
| 11 (Diaphragm) | ∞ | 1.00000 | | |
| 12 | 91.14680 | 0.88440 | 1.92286 | 20.9 |
| 13 | 563.09830 | Variable | | |
| 14* | 11.60680 | 5.29450 | 1.51845 | 70.0 |
| 15* | −30.97720 | 0.20000 | | |
| 16 | 33.27480 | 2.25000 | 1.51680 | 64.2 |
| 17 | −65.21200 | 0.55000 | 2.00100 | 29.1 |
| 18 | 13.51660 | 1.30000 | | |
| 19* | 16.51440 | 3.72120 | 1.58913 | 61.3 |
| 20* | −25.64090 | Variable | | |
| 21 | −1172.65290 | 2.56490 | 1.92286 | 20.9 |
| 22 | −16.37850 | 0.80000 | 1.88202 | 37.2 |
| 23* | 17.37150 | Variable | | |
| 24* | 96.77980 | 2.61040 | 1.51845 | 70.0 |
| 25* | −49.77210 | (BF) | | |
| Image surface | ∞ | | | |

TABLE 8

(Aspherical data)

Surface No. 3

K = 0.00000E+00, A4 = 1.19054E−06, A6 = −2.57541E−10,
A8 = −4.29119E−13 A10 = 7.51529E−16
Surface No. 4

K = 0.00000E+00, A4 = 2.64437E−05, A6 = −9.93943E−08,
A8 = 4.24958E−10 A10 = −1.05309E−12
Surface No. 14

K = 0.00000E+00, A4 = −5.97262E−05, A6 = −8.51313E−08,
A8 = −2.68017E−09 A10 = 8.10554E−12
Surface No. 15

K = 0.00000E+00, A4 = 9.63105E−06, A6 = 8.41305E−07,
A8 = −9.97338E−09 A10 = 5.51882E−11
Surface No. 19

K = 0.00000E+00, A4 = −1.05096E−04, A6 = 5.66408E−09,
A8 = 2.63329E−08 A10 = −3.91149E−13
Surface No. 20

K = 0.00000E+00, A4 = −3.34994E−05, A6 = −1.10627E−07,
A8 = 2.33207E−08 A10 = 1.24605E−10
Surface No. 23

K = 0.00000E+00, A4 = 3.28246E−05, A6 = 2.04303E−07,
A8 = −1.89756E−08 A10 = 2.73388E−10
Surface No. 24

K = 0.00000E+00, A4 = −9.43777E−06, A6 = −1.24057E−07,
A8 = 8.68159E−09 A10 = −6.86225E−11
Surface No. 25

K = 0.00000E+00, A4 = −2.64187E−05, A6 = −4.06586E−07,
A8 = 1.17456E−08 A10 = −8.00712E−11

TABLE 9

(Various data)
Zooming ratio 7.76939

|  | Wide-angle limit | Middle position | Telephoto limit |
|---|---|---|---|
| Focal length | 12.4205 | 34.6206 | 96.4995 |
| F-number | 4.15010 | 5.09854 | 5.80121 |
| Half view angle | 42.2965 | 17.3197 | 6.2524 |
| Image height | 10.0000 | 10.8150 | 10.8150 |
| BF | 18.0000 | 18.0000 | 18.0000 |
| d3 | 0.7000 | 14.3566 | 25.6118 |
| d10 | 25.9181 | 12.2616 | 1.0000 |
| d13 | 15.2606 | 5.6812 | 0.7000 |
| d20 | 1.6000 | 4.2861 | 9.3760 |
| d23 | 4.3543 | 11.2475 | 11.1452 |
| Entrance pupil position | 21.1584 | 54.6785 | 103.2825 |
| Exit pupil position | −64.0054 | −60.4942 | −56.2361 |
| Front principal points position | 31.1674 | 69.5035 | 34.0081 |
| Back principal points position | 93.5449 | 71.4329 | 9.4379 |

Zoom lens unit data

| Lens unit | Initial surface No. | Focal length | Overall length of lens unit | Front principal points position | Back principal points position |
|---|---|---|---|---|---|
| 1 | 1 | 57.19177 | 9.01760 | −0.77470 | 3.28785 |
| 2 | 4 | −11.84029 | 9.97370 | 0.69682 | 2.70510 |
| 3 | 11 | 117.73404 | 1.88440 | 0.91125 | 1.33613 |
| 4 | 14 | 19.12181 | 13.31570 | 2.95733 | 5.65879 |
| 5 | 21 | −20.37424 | 3.36490 | 1.75041 | 3.35831 |
| 6 | 24 | 63.78545 | 2.61040 | 1.14222 | 2.02298 |

(Numerical Example 4)

The zoom lens system of Numerical Example 4 corresponds to Embodiment 4 shown in FIG. 10. Table 10 shows the surface data of the zoom lens system of Numerical Example 4. Table 11 shows the aspherical data. Table 12 shows the various data.

TABLE 10

(Surface data)

| Surface number | r | d | nd | vd |
|---|---|---|---|---|
| Object surface | ∞ |  |  |  |
| 1 | 39.91790 | 1.50000 | 1.84666 | 23.8 |
| 2 | 30.90600 | 7.66790 | 1.59282 | 68.6 |
| 3 | −488.48540 | 0.10000 | 1.51358 | 51.6 |
| 4* | −486.00560 | Variable |  |  |
| 5* | −151.62810 | 0.10000 | 1.51358 | 51.6 |
| 6 | −677.72420 | 1.00000 | 1.91082 | 35.2 |
| 7 | 13.86270 | 6.44730 |  |  |
| 8 | −32.82990 | 0.60000 | 1.88300 | 40.8 |
| 9 | 91.06540 | 0.20000 |  |  |
| 10 | 40.26770 | 2.97900 | 1.95906 | 17.5 |
| 11 | −93.58000 | Variable |  |  |
| 12 (Diaphragm) | ∞ | 1.00000 |  |  |
| 13 | 63.40180 | 1.11480 | 1.48749 | 70.4 |
| 14 | −936.81530 | Variable |  |  |
| 15* | 12.77980 | 3.67010 | 1.51845 | 70.0 |
| 16* | −98.55080 | 0.20000 |  |  |
| 17 | 15.67900 | 3.06940 | 1.61310 | 44.4 |
| 18 | −74.00310 | 0.55000 | 1.91082 | 35.2 |
| 19 | 10.97560 | 1.43860 |  |  |
| 20* | 19.42110 | 3.99960 | 1.58913 | 61.3 |
| 21 | −14.22940 | 0.50000 | 1.84666 | 23.8 |
| 22 | −22.48220 | Variable |  |  |
| 23 | 105.02670 | 2.53200 | 1.92286 | 20.9 |
| 24 | −15.60570 | 0.80000 | 1.88202 | 37.2 |
| 25* | 12.69040 | Variable |  |  |
| 26* | 51.87660 | 4.78460 | 1.51845 | 70.0 |
| 27 | −23.89110 | 0.70000 | 2.00069 | 25.5 |
| 28 | −40.53650 | (BF) |  |  |
| Image surface | ∞ |  |  |  |

TABLE 11

(Aspherical data)

Surface No. 4

K = 0.00000E+00, A4 = 1.30616E−06, A6 = −1.14924E−10,
A8 = −8.86775E−13 A10 = 1.24163E−15, A12 = −6.54677E−19,
A14 = 1.61156E−21
Surface No. 5

K = 0.00000E+00, A4 = 2.51187E−05, A6 = −1.25139E−07,
A8 = 5.64373E−10 A10 = −1.37447E−12, A12 = 8.94268E−16,
A14 = 0.00000E+00
Surface No. 15

K = 0.00000E+00, A4 = −3.36509E−05, A6 = −9.57334E−08,
A8 = −9.08472E−10 A10 = −8.52124E−12, A12 = 0.00000E+00,
A14 = 0.00000E+00

TABLE 11-continued (Aspherical data)

Surface No. 16

K = 0.00000E+00, A4 = 7.79990E−07, A6 = 2.56834E−09,
A8 = 6.20367E−11 A10 = −7.08705E−12, A12 = 0.00000E+00,
A14 = 0.00000E+00
Surface No. 20

K = 0.00000E+00, A4 = −3.85145E−05, A6 = −1.35207E−07,
A8 = 3.75862E−09 A10 = −2.89813E−11, A12 = −6.73117E−19,
A14 = 0.00000E+00
Surface No. 25

K = 0.00000E+00, A4 = 1.28948E−05, A6 = −1.65633E−07,
A8 = −5.74343E−09 A10 = 6.49197E−11, A12 = 0.00000E+00,
A14 = 0.00000E+00
Surface No. 26

K = 0.00000E+00, A4 = 2.36870E−05, A6 = 8.94156E−08,
A8 = −4.73295E−10 A10 = 1.33864E−12, A12 = 0.00000E+00,
A14 = 0.00000E+00

TABLE 12

(Various data)
Zooming ratio 9.32125

|  | Wide-angle limit | Middle position | Telephoto limit |
|---|---|---|---|
| Focal length | 12.4210 | 37.9215 | 115.7797 |
| F-number | 4.15035 | 5.26013 | 5.80106 |
| Half view angle | 41.8150 | 15.9456 | 5.2258 |
| Image height | 10.0000 | 10.8150 | 10.8150 |
| BF | 14.6000 | 14.6000 | 14.6000 |
| d4 | 0.7000 | 17.4255 | 35.0191 |
| d11 | 35.3191 | 18.5935 | 1.0000 |
| d14 | 16.6505 | 2.5160 | 0.7000 |
| d22 | 1.9662 | 3.3590 | 7.5259 |
| d25 | 4.3904 | 17.1322 | 14.7812 |
| Entrance pupil position | 23.2799 | 61.7160 | 141.9922 |
| Exit pupil position | −52.5185 | −64.7409 | −58.6876 |
| Front principal points position | 32.7644 | 77.4269 | 29.2187 |
| Back principal points position | 106.1787 | 80.6625 | 2.7635 |

Zoom lens unit data

| Lens unit | Initial surface No. | Focal length | Overall length of lens unit | Front principal points position | Back principal points position |
|---|---|---|---|---|---|
| 1 | 1 | 70.13468 | 9.26790 | 0.02077 | 3.56211 |
| 2 | 5 | −14.19410 | 11.32630 | 0.30113 | 2.17640 |
| 3 | 12 | 121.85817 | 2.11480 | 1.04752 | 1.41260 |
| 4 | 15 | 19.98649 | 13.42770 | 2.09841 | 5.18696 |
| 5 | 23 | −17.54708 | 3.33200 | 2.06209 | 3.61986 |
| 6 | 26 | 69.27198 | 5.48460 | 1.61886 | 3.53478 |

(Numerical Example 5)

The zoom lens system of Numerical Example 5 corresponds to Embodiment 5 shown in FIG. 13. Table 13 shows the surface data of the zoom lens system of Numerical Example 5. Table 14 shows the aspherical data. Table 15 shows the various data.

TABLE 13

(Surface data)

| Surface number | r | d | nd | vd |
|---|---|---|---|---|
| Object surface | ∞ |  |  |  |
| 1 | 104.03640 | 1.50000 | 1.84666 | 23.8 |
| 2 | 56.09980 | 14.98790 | 1.49700 | 81.6 |
| 3 | 13731.53470 | 0.20000 |  |  |
| 4 | 50.77720 | 7.41760 | 1.80420 | 46.5 |
| 5 | 131.19900 | Variable |  |  |
| 6* | 148.22700 | 0.10000 | 1.51358 | 51.6 |
| 7 | 83.35340 | 1.00000 | 1.91082 | 35.2 |
| 8 | 12.99500 | 8.44260 |  |  |
| 9 | −26.53430 | 0.60000 | 1.88300 | 40.8 |
| 10 | 82.18150 | 0.20000 |  |  |
| 11 | 44.85960 | 3.05250 | 1.95906 | 17.5 |
| 12 | −92.30710 | Variable |  |  |
| 13 (Diaphragm) | ∞ | 1.88990 |  |  |
| 14 | 228.59420 | 0.81820 | 1.92286 | 20.9 |
| 15 | −3457.81620 | Variable |  |  |
| 16 | 14.89910 | 6.14150 | 1.51823 | 59.0 |
| 17 | −40.32900 | 0.20000 |  |  |
| 18* | 42.60060 | 1.70780 | 1.58313 | 59.5 |
| 19 | −42.64100 | 0.55000 | 1.91082 | 35.2 |
| 20 | 31.14490 | 1.30000 |  |  |
| 21* | 20.24890 | 4.42870 | 1.58913 | 61.3 |
| 22 | −12.38420 | 0.50000 | 1.84666 | 23.8 |
| 23 | −18.00100 | Variable |  |  |
| 24 | −52.02550 | 2.23920 | 1.92286 | 20.9 |
| 25 | −11.72710 | 0.80000 | 1.88202 | 37.2 |
| 26* | 9.01370 | Variable |  |  |
| 27* | 19.73000 | 19.18810 | 1.58332 | 59.1 |
| 28 | −10.74200 | 0.70000 | 2.00100 | 29.1 |
| 29 | −22.04960 | (BF) |  |  |
| Image surface | ∞ |  |  |  |

TABLE 14

(Aspherical data)

Surface No. 6

K = 0.00000E+00, A4 = 1.53879E−05, A6 = −4.94253E−08,
A8 = 6.31789E−11 A10 = −3.17786E−14
Surface No. 18

K = 0.00000E+00, A4 = −5.85706E−05, A6 = −5.15210E−07,
A8 = 1.15313E−10 A10 = 2.15030E−12
Surface No. 21

K = 0.00000E+00, A4 = −7.03965E−05, A6 = −1.21965E−08,
A8 = 2.44293E−09 A10 = −3.68148E−11
Surface No. 26

K = 0.00000E+00, A4 = −9.95332E−05, A6 = −1.55656E−06,
A8 = −1.76744E−08 A10 = −1.24241E−11
Surface No. 27

K = 0.00000E+00, A4 = 5.80979E−05, A6 = −1.31866E−07,
A8 = 4.93873E−10 A10 = 4.16431E−13

TABLE 15

(Various data)
Zooming ratio 9.32109

|  | Wide-angle limit | Middle position | Telephoto limit |
|---|---|---|---|
| Focal length | 12.4192 | 37.9175 | 115.7607 |
| F-number | 4.15023 | 5.00038 | 5.80090 |
| Half view angle | 40.6954 | 15.7591 | 5.2283 |
| Image height | 10.0000 | 10.8150 | 10.8150 |
| BF | 14.7000 | 14.7000 | 14.7000 |
| d5 | 0.7000 | 28.5768 | 45.5318 |

TABLE 15-continued (Various data)
Zooming ratio 9.32109

| | Wide-angle limit | Middle position | Telephoto limit |
|---|---|---|---|
| d12 | 45.8266 | 17.9487 | 1.0000 |
| d15 | 5.9204 | 3.3289 | 0.7000 |
| d23 | 1.6000 | 3.6925 | 6.3152 |
| d26 | 5.0000 | 5.5001 | 5.5000 |
| Entrance pupil position | 34.8347 | 113.3561 | 226.0277 |
| Exit pupil position | −62.7640 | −61.5023 | −58.7707 |
| Front principal points position | 44.7936 | 127.8971 | 113.6373 |
| Back principal points position | 139.2165 | 113.7946 | 35.9150 |

Zoom lens unit data

| Lens unit | Initial surface No. | Focal length | Overall length of lens unit | Front principal points position | Back principal points position |
|---|---|---|---|---|---|
| 1 | 1 | 84.75291 | 24.10550 | 6.87806 | 15.82283 |
| 2 | 6 | −12.98650 | 13.39510 | 1.52523 | 3.98842 |
| 3 | 13 | 232.36669 | 2.70810 | 1.91629 | 2.30893 |
| 4 | 16 | 15.30052 | 14.82800 | 5.65785 | 8.49037 |
| 5 | 24 | −8.72225 | 3.03920 | 1.31988 | 2.80644 |
| 6 | 27 | 29.69800 | 19.88810 | 3.03855 | 9.19947 |

The following Table 16 shows the corresponding values to the individual conditions in the zoom lens systems of each of Numerical Examples.

TABLE 16

(Values corresponding to conditions)

| | Numerical Example | | | | |
|---|---|---|---|---|---|
| Condition | 1 | 2 | 3 | 4 | 5 |
| (1) $f_W/T_{1G}$ | 1.04 | 1.01 | 1.38 | 1.34 | 0.52 |
| (2) $Y_T/T_{1G}$ | 0.90 | 0.88 | 1.20 | 1.17 | 0.45 |
| (3) $f_W/T_{\gamma G}$ | 1.56 | 1.53 | 4.76 | 2.26 | 0.62 |
| (4) $Y_T/T_{\gamma G}$ | 1.36 | 1.33 | 4.14 | 1.97 | 0.54 |
| (5) $f_W/T_{air1G2GW}$ | 17.74 | 17.74 | 17.74 | 17.74 | 17.74 |
| (6) $nd_{1G}$ | 1.55 | 1.50 | 1.77 | 1.59 | 1.50 |
| (7) $vd_{1G}$ | 71.70 | 81.60 | 50.00 | 68.60 | 81.60 |
| (8) $|M_{\alpha G}/M_{\beta G}|$ | 1.58 | 1.43 | 2.15 | 1.54 | 10.43 |
| (9) $L_T/f_T$ | 1.37 | 1.04 | 1.10 | 1.02 | 1.31 |
| (10) $(f_T/f_W) \times (\tan(\theta_W))^2$ | 6.36 | 7.82 | 6.43 | 7.46 | 6.89 |
| (11) $|M_{\beta G}/f_W|$ | 0.70 | 0.73 | 0.55 | 0.84 | 0.04 |

The present disclosure is applicable to a digital still camera, a digital video camera, a camera for a mobile terminal device such as a smart-phone, a camera for a Personal Digital Assistance, a surveillance camera in a surveillance system, a Web camera, a vehicle-mounted camera or the like. In particular, the present disclosure is applicable to a photographing optical system where high image quality is required like in a digital still camera system or a digital video camera system.

Also, the present disclosure is applicable to, among the interchangeable lens apparatuses in the present disclosure, an interchangeable lens apparatus having motorized zoom function, i.e., activating function for the zoom lens system by a motor, with which a digital video camera system is provided.

As described above, embodiments have been described as examples of art in the present disclosure. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present disclosure, it is understood that various modifications, replacements, additions, omissions, and the like can be performed in the scope of the claims or in an equivalent scope thereof.

What is claimed is:

1. A zoom lens system having at least five lens units, each lens unit being composed of at least one lens element,
the zoom lens system, in order from an object side to an image side, comprising:
a first lens unit having positive optical power; and
a second lens unit having negative optical power, and
the zoom lens system, in order from the image side to the object side, comprising:
a lens unit γ having positive optical power;
a lens unit β having negative optical power; and
a lens unit α having positive optical power, wherein
the first lens unit is composed of only optical elements having optical power,
in zooming from a wide-angle limit to a telephoto limit at a time of image taking, at least the first lens unit is fixed with respect to an image surface, the lens unit α moves with respect to the image surface separately from an aperture diaphragm, and the lens unit β moves to the object side, and
the following condition (6) is satisfied:

$$nd_{1G} < 1.65 \quad (6)$$

where,
$nd_{1G}$ is refractive index to the d-line of an optical element having the largest Optical axial thickness among the optical elements constituting the first lens unit.

2. The zoom lens system as claimed in claim 1, wherein the following condition (1) is satisfied:

$$0.5 < f_W/T_{1G} < 3.0 \quad (1)$$

where,
$f_W$ is a focal length of the zoom lens system at the wide-angle limit, and
$T_{1G}$ is an optical axial thickness of the first lens unit.

3. The zoom lens system as claimed in claim 1, wherein the following condition (2) is satisfied:

$$0.4 < Y_T/T_{1G} < 3.0 \quad (2)$$

where,
$Y_T$ is an image height at the telephoto limit, and
$T_{1G}$ is an optical axial thickness of the first lens unit.

4. The zoom lens system as claimed in claim 1, wherein the following condition (3) is satisfied:

$$0.3 < f_W/T_{\gamma G} < 7.0 \quad (3)$$

where,
$f_W$ is a focal length of the zoom lens system at the wide-angle limit, and
$T_{\gamma G}$ is an optical axial thickness of the lens unit γ.

5. The zoom lens system as claimed in claim 1, wherein the following condition (4) is satisfied:

$$0.2 < Y_T/T_{\gamma G} < 6.0 \quad (4)$$

where, $Y_T$ is an image height at the telephoto limit, and
$T_{\gamma G}$ is an optical axial thickness of the lens unit γ.

6. The zoom lens system as claimed in claim 1, wherein the following condition (5) is satisfied:

$$4.0 < f_W/T_{air1G2GW} < 350.0 \quad (5)$$

where,
$f_W$ is a focal length of the zoom lens system at the wide-angle limit, and
$T_{air1G2GW}$ is an air space between the first lens unit and the second lens unit at the wide-angle limit.

7. The zoom lens system as claimed in claim 1, wherein the following condition (7) is satisfied:

$$48 < vd_{1G} \quad (7)$$

where,
$vd_{1G}$ is an Abbe number to the d-line of an optical element having the largest optical axial thickness among the optical elements constituting the first lens unit.

8. The zoom lens system as claimed in claim 1, wherein the zoom lens system is provided with an image blur compensating lens unit which moves in a direction perpendicular to an optical axis in order to optically compensate image blur, and
in zooming from the wide-angle limit to the telephoto limit at the time of image taking, the image blur compensating lens unit moves with respect to the image surface.

9. The zoom lens system as claimed in claim 1, wherein the zoom lens system is provided with an image blur compensating lens unit which moves in a direction perpendicular to an optical axis in order to optically compensate image blur, and
the image blur compensating lens unit is a part of any one of the lens units constituting the zoom lens system.

10. The zoom lens system as claimed in claim 1, wherein in zooming from the wide-angle limit to the telephoto limit at the time of image taking, the aperture diaphragm is fixed with respect to the image surface.

11. The zoom lens system as claimed in claim 1, wherein in zooming from the wide-angle limit to the telephoto limit at the time of image taking, the lens unit γ is fixed with respect to the image surface.

12. The zoom lens system as claimed in claim 1, wherein in zooming from the wide-angle limit to the telephoto limit at the time of image taking, the number of the aperture diaphragm and lens units, that are fixed with respect to the image surface, is equal to the number of lens units that move with respect to the image surface, or the number of the lens units that are fixed with respect to the image surface is equal to the number of the lens units that move with respect to the image surface.

13. The zoom lens system as claimed in claim 1, wherein the following condition (8) is satisfied:

$$0.7 < |M_{\alpha G}/M_{\beta G}| < 11.0 \quad (8)$$

where, $M_{\alpha G}$ is an amount of movement of the lens unit α with respect to the image surface, in zooming from the wide-angle limit to the telephoto limit at the time of image taking, and
$M_{\beta G}$ is an amount of movement of the lens unit β with respect to the image surface, in zooming from the wide-angle limit to the telephoto limit at the time of image taking.

14. The zoom lens system as claimed in claim 1, wherein the following condition (9) is satisfied:

$$L_T/f_T < 1.45 \quad (9)$$

where,
$L_T$ is an overall length of the zoom lens system, that is a distance from a most object side surface of the first lens unit to the image surface, at the telephoto limit, and
$f_T$ is a focal length of the zoom lens system at the telephoto limit.

15. The zoom lens system as claimed in claim 1, wherein the following condition (10) is satisfied:

$$2.6 < (f_T/f_W) \times (\tan(\theta_W))^2 \quad (10)$$

where,
$f_T$ is a focal length of the zoom lens system at the telephoto limit,
$f_W$ is a focal length of the zoom lens system at the wide-angle limit, and
$\theta_W$ is a half view angle (°) at the wide-angle limit.

16. The zoom lens system as claimed in claim 1, wherein the following condition (11) is satisfied:

$$0.02 < |M_{\beta G}/f_W| < 2.0 \quad (11)$$

where,
$M_{\beta G}$ is an amount of movement of the lens unit β with respect to the image surface, in zooming from the wide-angle limit to the telephoto limit at the time of image taking, and
$f_W$ is a focal length of the zoom lens system at the wide-angle limit.

17. The zoom lens system as claimed in claim 1, wherein focusing from an infinity in-focus condition to a close-object in-focus condition is performed by moving the lens unit β along an optical axis direction.

18. An interchangeable lens apparatus comprising:
the zoom lens system as claimed in claim 1; and
a lens mount section which is connectable to a camera body including an image sensor for receiving an optical image formed by the zoom lens system and converting the optical image into an electric image signal.

19. A camera system comprising:
an interchangeable lens apparatus including the zoom lens system as claimed in claim 1; and
a camera body which is detachably connected to the interchangeable lens apparatus via a camera mount section, and includes an image sensor for receiving an optical image formed by the zoom lens system and converting the optical image into an electric image signal.

* * * * *